LIGHT-SENSITIVE SHEETS AND PROCESS FOR PRODUCING TRANSFER IMAGES

Filed June 29, 1954 2 Sheets-Sheet 1

INVENTORS
WILLEM MARIE BUSKES
MATHIEU MARTIN VAN RHIJN
THEODORUS PETRUS WILHELMUS SANDERS
BY
Pollard, Johnston, Smythe Robertson
ATTORNEYS

LIGHT-SENSITIVE SHEETS AND PROCESS FOR PRODUCING TRANSFER IMAGES

Filed June 29, 1954 2 Sheets-Sheet 2

INVENTORS
WILLEM MARIE BUSKES
MATHIEU MARTIN VAN RHIJN,
THEODORUS PETRUS WILHELMUS SANDERS
BY
Pollard, Johnston, Smythe & Robertson
ATTORNEYS 3,010,391
Patented Nov. 28, 1961

3,010,391

LIGHT-SENSITIVE SHEETS AND PROCESS FOR PRODUCING TRANSFER IMAGES

Willem Marie Buskes, Mathieu Martin van Rhijn, and Theodorus Petrus Wilhelmus Sanders, Venlo, Netherlands, assignors to Chemische Fabriek L. Van der Grinten N.V., Venlo, Netherlands, a limited liability company Filed June 29, 1954, Ser. No. 440,178
17 Claims. (Cl. 101—149.2)

The invention relates to a process for producing an image on a receiving surface wherein a light-sensitive sheet is imagewise exposed in accordance with an original from which the image is to be made, the exposed surface of the sheet is pressed against a receiving surface so that matter from the exposed sheet is transferred imagewise to the receiving surface, and the two surfaces are then separated from one another.

The invention also relates to the making of graphic prints and to light-sensitive sheets for carrying out the aforesaid process.

As will be described, the process according to the present invention operates, in regard to the exposure from the original, on the principles of screen reflectography. This was first described in French Patent No. 693,335 and later in French Patent No. 762,542. In the last-mentioned French patent there is described, inter alia, a support with a light-sensitive layer and an overlying screen, the screen matter of which may be washed or brushed off later. In the process according to the present invention the light-sensitive sheet also carries a screen.

United States patent application Serial No. 341,197, copending herewith describes a process in which an imagewise exposed screen sheet is subjected to a transfer operation. By this transfer the image is formed on the receiving surface from certain screen parts, while other screen parts remain on the original support. Thus in that process the screen is broken up imagewise, and in said copending application this is called selective bodily transfer. For carrying out the process of the said application there may be employed a light-sensitive screen sheet, one surface of the support of which carries the screen parts and superimposed thereon light-sensitive matter. The light-sensitive matter is of such a nature that on exposure it causes an alteration of the transferability of the screen parts, on which alteration the formation of the image on the receiving surface is based.

The process according to the present invention comprises imagewise exposing in the manner of screen reflectography a light-sensitive sheet comprising a light-pervious support, a permanent screen carried on said support and consisting of permanent screen portions substantially impervious to actinic light alternating with screen portions pervious to actinic light, there being substantially no transition between said portions, and light-sensitive matter located on the side of said screen remote from the support, said light-sensitive matter being substantially free from grains scattering actinic light and being such that its transferability to another support is altered by exposure to actinic light; pressing the exposed surface of said screen sheet into contact with an image receiving surface to effect transfer of material imagewise from said screen sheet to said image-receiving surface, at least one of said surfaces being wetted before they are pressed together; and separating the said surfaces from one another, the said screen being attached sufficiently strongly to its support that it does not separate therefrom in said transfer operation. The permanent impervious screen portions remain impervious to actinic light during the operations of the process according to the invention.

Although in the process according to the present invention the screen thus remains united with its support, and consequently also with the remnant image formed in the transfer, this process of the invention offers advantages, inter alia in that it eliminates the necessity which arises in the process of said copending application of balancing the adhesion between screen parts and support. By the invention an embodiment of screen reflectography is for the first time realized in which during exposure the light-sensitive matter is in the immediate proximity of a fixed and permanent screen (which proximity, in the practice of copying with diffuse light, is almost a conditio sine qua non for screen reflectography), as well as in the immediate proximity of the original (such in contradistinction to the process with screen sheets as described, for example, in British Patent No. 630,874). Yet the present process, like that of British Patent No. 630,874, yields an image freed from the permanent screen which was used in the reflex copying operation.

The invention thus combines the advantages of a fixed permanent screen with the sharpness of image obtainable when in reflex copying the light-sensitive matter is located in the immediate proximity of the original. Moreover, it offers the advantage that the pervious support of the screen sheet need not be as clear as glass (as is highly desirable, if not necessary, with the screen sheets of British Patent No. 630,874).

In the process according to the invention nonlaterally reversed images are obtained on the (usually non-translucent) receiving support. Obviously the fineness of the screen should be adapted to the lack of image distance proper (compare British Patent No. 425,434), particularly when copying from originals having smooth surfaces. As will be illustrated in one of the examples, the invention offers the possibility of making transfer images showing substantially unscreened image portions.

Screen portions remaining impervious and united with their support during the operation of the process according to the invention consist, for example, of deposits of metals, metal sulphides such as lead sulphide, dyestuffs and the like, which are formed in or on a film, or in or on a surface of some light-pervious support. They may, for example, be formed by an imbibition process or photographically, e.g. by exposing a diazo layer under a screen and developing it to an azo dyestuff screen image. Impervious screen portions may also be formed by impressing a screen of permanent impervious matter or by applying the latter in a special manner as described hereinafter. In both these latter cases the linkage with the light-pervious support should be made strong enough for the screen to remain united with the support during the image transfer step.

Since the light-sensitive matter should be substantially free from grains scattering actinic light, silver halide emulsions, other than the so-called Lippmann emulsions, are not considered for the process of the invention on practical grounds.

For the sake of simplicity the term "transfer" is used hereinafter mainly in a generic sense. This term will thus be used for direct, indirect, selective, bodily, first, second, and further transfer, for transfer of a remnant image, and for transfer by diffusion. Wherever not otherwise defined, the term "transfer" implies transfer at room temperature.

Examples of surfaces denoted by the term "receiving surface" are: surfaces of materials such as papers, particularly those which have a closed smooth surface (art papers), transparent papers, glass, milk glass, synthetic resin products and the like, and also, as will be described, the surfaces of "receiving printing plates" for the production of graphic prints, such as a bi-metal plate (e.g. a steel plate having on its surface a thin layer of copper), a lithographic stone, a grained aluminium, zinc or steel plate, paper specially made for planography, an aluminium plate carrying a water-receptive oxide layer, and a plastic sheet having a water-receptive surface, such as a superficially deacylated cellulose ester sheet.

Wetting is preferably effected with water but aqueous solutions (for example of salts, wetting agents or alcohol) which behave like water, may also be used. Other wetting liquids will be described in the examples.

In order to make the process more reliable and more accurately adjustable to the screen sheet materials and receiving materials used, which may be of various kinds, it is advisable to combine the operations of wetting and pressing-together in a single step. An apparatus for this is described later herein.

The invention will now be described with reference to the accompanying drawings which schematically illustrate specific embodiments of the materials and apparatus used in the invention. In these drawings.

In the drawings, corresponding parts are always designated by the same reference numbers.

Figures 1, 2, 3, 4, 5, 6, 7, 8:
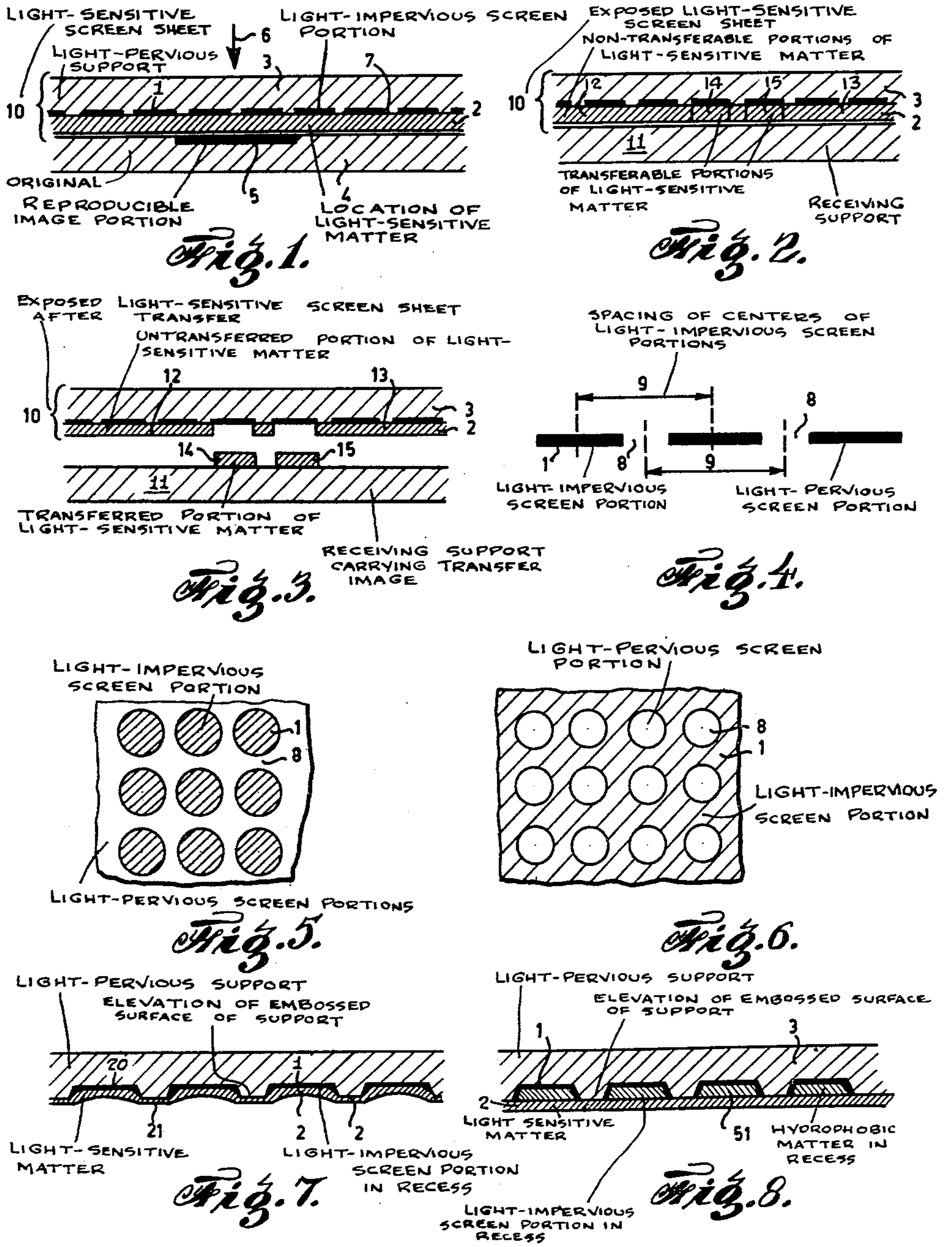
FIG. 1 illustrates the structure of a light-sensitive screen sheet for use in the process according to the invention, in contact with an original.
FIGS. 2 and 3 illustrate the procedure on transfer.
FIG. 4 illustrates the screen structure.
FIGS. 5 and 6 illustrate two ways, in which the pervious and the substantially impervious screen portions may be grouped in the screen pattern.
FIGS. 7 and 8 illustrate structures of light-sensitive screen sheets the supports of which show recesses and elevations.

In FIG. 1 (diagrammatic cross-section) 1 is an impervious screen portion; 2 indicates the location of the light-sensitive matter (layer 2 may sometimes be extremely thin, e.g. when there is little or no binder in the light-sensitive matter); 3 represents the light-pervious support, and 4 the original with the dark image portion 5. The elements 1, 2 and 3 form together one unit, the light-sensitive screen sheet 10. The screen portions 1 are firmly united with support 3. Original and screen sheet are in close contact with one another. However, for clearness sake this close contact is not shown. When making the screen reflex copy, the light is incident in the direction of the arrow 6.

FIG. 2 is a diagrammatic cross-section of a light-sensitive screen sheet 10, which, after the imagewise exposure according to FIG. 1, has been brought into wet contact with a receiving support 11. It is assumed that after the imagewise exposure the portions 12 and 13 of the light-sensitive matter 2 are not transferable, and that the portions 14 and 15 are transferable.

FIG. 3 illustrates the situation after the transfer and separation steps. In the screen sheet 10 the portions 12 and 13 of matter 2 were non-transferable after the exposure, and they have remained on it. The transferable portions 14 and 15 have been transferred to the receiving support 11.

When the matter forming the transferable image portions has insufficient cohesion or where the transfer occurs by diffusion, the transfer may be incomplete; i.e. on transfer this matter will only partially pass over to the receiving surface. Provided a sufficient quantity has been transferred, however, the transfer image may nevertheless be excellent.

Provided the quantity of matter available in the transferable image portions is sufficient, incomplete transfer may sometimes be turned to advantage by using the imperfect remnant image formed in the first transfer for a second, and even for subsequent transfers, each time on a fresh receiving surface, part of the matter from the originally transferable image portions being each time transferred, until the quantity available is exhausted.

Although inessential in some cases (e.g. in the process for making printing plates, described later herein) in other instances it is necessary in the process according to the invention to make the matter involved in the transfer contrast visually with the receiving surface. In many instances this will be merely a question of the colour of the matter to be transferred on the one hand and that of the receiving surface on the other hand. Receiving surfaces will generally have a light colour, and then the matter to be transferred may be dark (pigmented). The pigment may also be formed after the transfer operation. When, for example, the matter transferred contains a diazo compound, an azo dyestuff may be formed therein in a simple manner.

As already stated, a light-sensitive sheet according to the invention carries a screen. Its support is pervious to light. The screen consists of permanent screen portions substantially impervious to actinic light, alternating with screen portions which are pervious thereto, substantially without any transitions between the impervious and the pervious screen portions. The light-sensitive matter is located on that side of the screen remote from the support. It is substantially free from grains scattering actinic light. Exposure of the light-sensitive matter causes an alteration of its transferability. The permanent screen is linked up with its support to such an extent that it remains united therewith during the transfer operation.

As already stated, this light-sensitive screen sheet has advantages for the process of the invention. Thus its light-pervious support need not be as clear as glass, e.g. it need not be more transparent than natural tracing paper, and it may thus be manufactured cheaply.

In the process according to the invention a light-sensitive screen sheet of which the light-sensitive matter contains a lyophilic binder is of particular utility. This use of a lyophilic binder in the light-sensitive matter, inter alia, has as explained later herein, the practical advantage of facilitating the transfer operation.

Lyophilic binders which are used for compounding light-sensitive matter are: gelatin, gum arabic, proteins, and fish-glue, though others are also used, e.g. agar-agar, dextrin, gum tragacanth, methyl cellulose, shellac, colophony, synthetic resins, and polyvinyl alcohol (see, inter alia, Eder, Ausführliches Handbuch der Photographie, vol. IV, 2nd part, pages 22–39, 379; 3rd part, pages 332 and 379; Kolloid-Zeitschrift, vol. 103, No. 2 (1943), page 167, German Patent No. 684,425).

When using a binder in the light-sensitive matter, the layer structure as illustrated in FIG. 1 becomes possible for said matter. This layer structure of the light-sensitive matter promotes sharpness of image, light-sensitivity, and transfer on relatively rough, e.g. grained receiving surfaces. The light-sensitive layer may, for example, have a thickness of 2–4 microns. When the light-sensitive matter has the structure of a finite layer a tearing process must presumably take place in this layer, during transfer, at the borderline between the transferable and non-transferable image portions. Generally in the process of this invention, probably owing to the use of a transfer liquid, this does not appear to affect adversely the formation of a sharp image on the receiving surface.

The sensitizing compound may be distributed homogeneously throughout the layer of lyophilic binder, or may be located in and on the outer surface only of the layer.

Suitable lyophilic binders may be divided into two classes, those which do not dissolve in water at room temperature and those which do. The distinction between non-dissolution and dissolution naturally is not clear-cut. The group of binders first-mentioned includes those which, when added to water (at room temperature) will at best swell within a reasonable length of time, but will not distribute homogeneously throughout the water;

an example is gelatin. When a representative of the other group is added to water (at room temperature) it will after some time be homogeneously mixed with the water; an example is gum arabic.

By the use of one or the other kind of binders different effects are obtained on transfer with the aid of water at room temperature, each of which has its especial advantages. This may be illustrated as follows:

A transfer process is used in which water at room temperature forms the transfer liquid. The light-sensitive substance is of such a nature that on exposure it will decrease the receptivity for water, or solubility in water, of the binder. When working with a light-sensitive layer of a non-dissolving lyophilic binder, its less exposed image portions, or the upper parts of them, will be transferred to the receiving surface. When working with a light-sensitive layer of lyophilic binder soluble in water at room temperature, treatment with a small quantity of liquid will not dissolve the binder in the unexposed portions, but it will cause the binder to become adhesive there and be transferred. The treatment with liquid will not be sufficient for achieving this in the exposed portions, in which the solubility of the layer has decreased. Thus in these portions no transfer will take place.

When in the case last described the transfer is carried out with a greater quantity of liquid, the binder in the less exposed image portions will be removed from the light-sensitive screen sheet by dissolution. Thus in these image portions little or no matter has been left for transfer. In the more exposed portions the binder has lost its solubility, but it still has sufficient capacity for absorbing liquid to develop an adhesive effect with the absorbed liquid on transfer. In this way matter may now be transferred from the exposed image portions to the receiving surface. Thus a negative transfer image is formed, i.e. one and the same light-sensitive layer may bring about opposite results.

As demonstrated above, screen sheets of which the light-sensitive matter on exposure changes its adhesive power in wetted condition are suitable for the process according to the invention.

For that form of the invention in which the transfer is effected with the aid of water, light-sensitive screen sheets of which the light-sensitive matter alters its water receptivity on exposure, are of particular utility.

Furthermore, light-sensitive screen sheets of which the light-sensitive matter, on exposure, alters its power to swell with water may be employed in the process of the invention and are advantageous when transferring on rough receiving surfaces.

The power of swelling with water naturally implies receptivity for water. On the other hand, however, water-receptivity is sometimes found in cases in which the swelling power is only slight. In general it is impracticable to discriminate sharply between receptivity for water, adhesive power on wetting, and swelling power. In practice it will naturally always have to be taken into account that the ambient atmosphere will contain water vapour, so that water will probably always affect the transfer, even in cases in which, for example, a water-free liquid is used.

In the foregoing discussion the difference in behaviour of a light-sensitive layer under different transfer conditions has been described, i.e. the behaviour of a light-sensitive layer with a soluble binder for the cases in which little and much liquid is used in the transfer. It has also been explained how one and the same light-sensitive layer can produce opposite transfer images. In one of the examples which follow a case is described in which on varying the temperature, the same phenomenon was observed with a layer of light-sensitive matter containing a non-soluble binder (gelatin). Also in this case the nature of the transfer image could be changed from positive to negative. Whatever the transfer conditions on the first transfer may, however, have been, and consequently of whatever nature a remnant image may be, it may be transferred to a fresh receiving support, e.g. a receiving printing plate, in a transfer operation differing from the first.

If, for example, the first transfer has been carried out at room temperature, the remnant image obtained may be transferred at a higher temperature. If in the first transfer the separation has been carried out immediately after the pressing-together, in the second transfer the cooperating surfaces may be left in contact with each other for a somewhat longer time after the pressing-together. In the first transfer the receiving surface may likewise have been a surface having little or no adhesive power, and then the second transfer may be carried out onto a receiving support, e.g. a receiving printing plate having some adhesive power. Obviously the first transfer may be replaced by a washing-out step.

The variants of the invention here described can be used to advantage, for example, when it is desired to make a positive transfer image from a negative original. The result, however, will always be that the image portions on the second transfer copy, for example, on the printing plate, will carry matter originating from the imagewise exposed screen sheet, for example, porous hydrophobic matter, if such matter was present in the imagewise exposed sheet.

The light-sensitive matter of the screen sheets for the process according to the invention is of the kind which, as a result of the photochemical reaction in those image portions which correspond to the light (white) image portions of the original, undergoes an alteration (not occurring or occurring only to a slight extent in the non-exposed or less exposed portions corresponding to the dark portions of the original) which affects the transferability of matter from the screen sheet to the receiving surface. As already stated, the light-sensitive matter should be substantially free from light-scattering grains.

In certain cases said transferability is altered by the light reaction in one sense, in other cases in the other sense. In most of the light-sensitive systems here under consideration, the water-receptivity is reduced by exposure. With other light-sensitive systems, which nevertheless are of the same kind, the contrary is the case.

The light-sensitive material, used in the invention, is essentially of the same kind as that which already finds wide application in various photographic and photomechanical processes. This sort of light-sensitive material, as well as processes which can be carried out with it, are described in the literature in many variations.

For instance, reference is made to J. M. Eder: "Ausführliches Handbuch der Photographie," vol. IV, 2nd part, 1926, wherein on pages 73–77, the so-called pigment paper (carbon tissue) is described, as well as the making of pigment prints (carbon prints) therewith. Sensitized pigment-paper (carbon tissue) also finds wide application in the intaglio-printing technique for the making of an image in a metal— (mostly copper) surface. See Eder: l.c. 3rd part, 4th edition, page 110. Also known are light-sensitive pigment layers on light-pervious supports, see Eder; l.c. 2nd part, pages 212–215. The light-sensitive material in such sensitized pigment papers (carbon tissues) principally consists of bichromated gelatin.

Further in Eder: l.c. 2nd part, pages 245–279, the gum-bichromate printing process is described. The light sensitive material of sensitized gum-bichromate printing paper principally consists of gum arabic and bichromate.

Light-sensitive material of the said kind is also used in producing relief printing matrixes. See: Eder, "Rezepte, Tabellen und Arbeitsvorschriften," 16–17 edition, wherein on page 264 a process is described for producing relief printing matrixes in zinc. As light-sensitive material there is mentioned here a protein and bichromate. Furthermore there is described on page 275 a process for producing half-tone matrixes in copper; in which the light-sensitive material is fish-glue, glucose (grape-sugar) and bichromate.

The above-mentioned light-sensitive materials belong to the kind, in which, by photochemical reactions only, or by a photochemical reaction followed by an after-treatment, an alteration (as compared to the situation before exposure) is effected, which involves a reduction of, for instance, the receptivity for water of the material.

Also suitable for use in the invention is light-sensitive material in which, by the photochemical reaction, a reversed alteration (as compared to the situation before exposure) is being effected. Such light-sensitive material mainly consists of a combination of a ferric compound, tartaric acid and gum arabic as is used in the so-called pigment-dusting-on process as described in Eder, l.c. 4th part, 3rd edition, pages 27 and 28.

Another example of a light-sensitive material applicable to the invention is used in colour photography, see Eder, l.c. 2nd part, page 377.

In addition to the compositions and compounds already mentioned, other substances have also been suggested for compounding light-sensitive matter of the said kind. As examples there may be mentioned: auramin, erythrosin, (tetraiodofluorescein), diazo compounds, and azido compounds. For these, reference is made to Eder, l.c. 2nd part, page 39; Netherlands Patents Nos. 35,423 and 59,407, and German Patent No. 858,195.

Preferably, according to the invention, the light-sensitive screen sheet employed is one in which the light-sensitive matter may contain a lyophilic binder and is transferable in the unexposed condition, exposure of said light-sensitive matter causing a decrease of its transferability. Such a light-sensitive screen sheet yields positive non-laterally reversed transfer images, e.g. printing plates, from positive originals.

In the process of the invention a screen sheet of which the light-sensitive matter contains a lyophilic binder and a chromate, will render particularly good service. Preferably the binder is hydrophilic and the transfer liquid is water. The use of this light-sensitive matter amounts to that of the classical combination of chromate and colloid. Such light-sensitive matter has little stability, but at low temperature it may nevertheless be stored for a reasonable length of time. Chromate-colloid systems of greater stability are known from United States Patent No. 2,526,759.

The light-sensitive matter of a light-sensitive screen sheet according to the invention may contain a diazo compound, possibly together with a lyophilic binder. Most diazo compounds have good light-sensitivity and are particularly suitable for the screen reflectography which forms an essential element of the process of the invention. Diazo layers are of better stability than chromate layers.

Besides a diazo compound the light-sensitive matter may contain an auxiliary chemical, which may assist in causing an alteration in transferability, as required for the process according to the invention. Auxiliary chemicals, for example, may be a chromate or an azo dyestuff coupling component. When the latter is employed, imagewise exposure may be succeeded by a treatment with ammonia fumes to induce coupling.

Light-sensitive screen sheets according to the invention which in the process of the invention give reliable results are those of which the light-sensitive matter contains a diazo compound the light decomposition product of which has the property of precipitating proteins (compart Netherlands Patent No. 35,423). Most of the examples will be based on the use of such a diazo compound, which may be used without the aid of any other chemical.

According to the invention a light-sensitive screen sheet may also be composed with an azido compound (compare, inter alia, Netherlands Patent No. 59,407 and German Patent No. 858,195), possibly together with a lyophic binder. As an azido compound, a p.p′-diazido-o-o′-disulphonic acid stilbene (compare Netherlands Patent No. 59,407) is particularly suitable.

As already stated water is preferred as transfer liquid in the process according to the invention. When this is used, screen sheets in which the surface of the screen which is remote from its light-pervious support (surface 7 in FIG. 1) is hydrophilic, which surface carries, together with light-sensitive matter, porous hydrophobic matter for imagewise transfer, yield on transfer, after imagewise exposure, particularly sharp transfer images which are fast to water. The porous hydrophobic matter preferably lies between the light-sensitive matter and the hydrophilic surface, but may also be intermingled with the light-sensitive matter. The imagewise transfer of the porous hydrophobic matter is particularly easy in the former case. A possible explanation for this is given later.

Porous hydrophobic matter may be composed in many ways. Thus, for example, a substantially insoluble powder may be made to cohere by means of a suitable (limited) quantity of binder, so as to form (e.g. on drying) a porous hydrophobic crust. The powder need not be hydrophobic per se; with powders such as barite, titanium dioxide and starch a hydrophobic binder may be used. With other powders, such as soot, calcium stearate powder, aluminum powder and copper powder, the binder may be either hydrophobic or hydrophilic. Alternatively, a porous hydrophobic substance may be formed from a hydrophobic film-forming material, mixed with a suitable quantity of a soluble substance, which, for example, can be washed out, leaving a porous hydrophobic film (for example, a mixture of collodion with glycerol, compare United States Patent No. 2,590,857).

When, as is illustrated later with reference to FIG. 8, hydrophobic matter is located in screen recesses only in register with impervious screen portions, any porous hydrophobic matter may be used. However, when the porous hydrophobic matter is to overlie the previous screen portions, it should be substantially free from light-scattering grains and, as described later with reference to the use of pigments, should not have excessive optical density.

The terms "permeable" and "porous" are to be regarded as equivalents (compare United States Patent No. 2,590,857). In view of the fact that there are numerous ways of compounding porous hydrophobic matter, the examples, for the sake of simplicity, only illustrate a few of them. It is to be noted that the porous hydrophobic matter must not form a layer of too great cohesion or a tough layer, such as rubber.

Among the light-sensitive systems which, on exposure, alter to such an extent that they decrease the transferability of porous hydrophobic matter, there are some which will be active without any binder. Some light-sensitive compounds, such as certain condensation products of diazo compounds with formaldehyde, are capable of yielding light-decomposition products which are probably capable of polymerizing. These light decomposition products may, probably by blocking the pores, affect the transferability of porous hydrophobic matter on (and possibly in) which they have been formed. When the surface of the screen with which the porous hydrophobic matter is linked up is hydrophilic, and when water is used as the transfer liquid, it may be supposed that the transfer water cannot reach that surface underneath the blocked porous hydrophobic matter; consequently it will remain dry, and its linkage with the hydrophobic matter relatively strong. On the other hand, non-exposed porous hydrophobic matter will remain unblocked and through it the transfer water may wet the hydrophilic surface, and, because hydrophobic matter has little adhesion to a wetted hydrophilic surface, weaken its linkage with the hydrophobic matter. It is then this latter hydrophobic matter which will have sufficient transferability to pass to a receiving surface having some adhesive power, whilst the blocked hydrophobic matter will remain linked with its original support.

Obviously a blocking process as assumed above may also be achieved with other light-sensitive systems.

In another embodiment of this invention a screen sheet carries, on that side of its screen which is remote from its light-pervious support, a hydrophilic auxiliary layer and superimposed thereon, the light-sensitive matter and porous hydrophobic matter for imagewise transfer. Preferably the light-sensitive matter again contains a binder. When water is used as the transfer liquid, this sheet yields very easily an excellent transfer image, or a printing plate with the properties already described.

Suitable substances for the said auxiliary layer are soluble substances, such as polyvinyl alcohol, gum arabic, agar-agar, methyl cellulose, and many others. Substances which are insoluble at room temperature may also be used; they must not, however, display too great adhesive power on wetting with the transfer liquid. Thus, for example casein is suitable, and so slightly hardened or tanned gelatin.

In a preferred light-sensitive screen sheet for use in the invention the light-sensitive matter carries a substance contrasting visually with the receiving surface, but scattering substantially no light rays to which said light-sensitive matter is sensitive. Said contrasting substance has an optical density below 0.8 for the said rays in those portions in the layer of light-sensitive matter overlying the light-pervious screen portions. Practical experience has shown that with an optical density for the actinic light rays higher than 0.8 the consequent necessary increase of exposure is as a rule not justified by the greater strength of the transfer image.

The substance contrasting visually with the receiving surface will often be an insoluble pigment, but may be a soluble dye, and in that case a number of transfer images can sometimes be successively transferred from the exposed screen sheet.

Screen sheets of regular screen pattern are particularly advantageous when copying is effected from originals of good quality, from line-drawings, and from printings. As already stated, the fineness of the screen structure is important. This is particularly the case when the process of the invention is used for copying "half-tone" or "dot" images.

The formation of "moiré effects" is largely avoided, and quite good reproductions of the half-tone dots is obtained when a screen sheet is used in which the mutual center distance between the light-pervious screen portions or between the light-impervious screen portions is less than 80 microns and greater than 20 microns. However, this naturally depends on the center distance of the half-tone dots in the original to be reproduced. The measures given above, however, are favourable in many circumstances occurring in practice.

FIG. 4 shows, in diagrammatic cross-section, the location of impervious screen portions 1 side by side with pervious screen portions 8. The mutual center distance between the impervious screen portions (= that between the pervious screen portions) is indicated by 9.

FIG. 5 is a diagrammatic view of a screen pattern in which the impervious screen portions 1 have the form of islands and are encircled by the pervious screen portions 8. However, a screen sheet in which the light-pervious screen portions have the form of islands generally gives better results. FIG. 6 illustrates this embodiment. Here the pervious portions 8 have the form of islands and are encircled by impervious screen portions 1. Under otherwise comparable conditions, a screen sheet of the pattern of FIG. 6 will need shorter exposure than one of the pattern of FIG. 5. This is particularly the case when copying from an original on a smooth (paper) surface and when the light passing through the pervious screen portions is diffuse.

A particularly suitable light-sensitive screen sheet according to the invention comprises a light-pervious support having on one side a screen-shaped system of recesses, in which the screen matter (forming the light-impervious screen portions) is anchored. The screen matter completely covers the bottom of the recesses, but, measured perpendicularly to the sheet, it only partially fills the recesses. The overlying light-sensitive matter is so distributed that more light-sensitive matter is present per unit of surface over the light-impervious than over the light-pervious screen portions.

FIG. 7 shows such a screen sheet with a light-pervious support 3, in the lower surface of which screenwise distributed recesses 20 have been made by embossing so that elevations 21 have been formed. The impervious screen portions 1 are located and anchored in the recesses. The light-sensitive matter is again denoted by 2. It shows the distribution referred to above. The advantage as compared with even distribution is that the exposure is shortened and/or the strength of the transfer image is improved. The sheet is particularly advantageous when the light-sensitive matter contains a pigment. For the use of recesses in light-sensitive screen sheets compare British Patent No. 626,501.

In a particular embodiment of the invention the light-sensitive screen sheet has in its screen surface recesses coinciding with the light-impervious screen portions. Hydrophobic matter is located in these recesses, and light-sensitive matter superimposed thereon. This light-sensitive screen sheet is illustrated by FIG. 8, in which 1 denotes a light-impervious screen portion, 51 the transferable hydrophobic matter and 2 the location of the light-sensitive matter. In this sheet larger quantities of hydrophobic matter may be used. This will improve the water-fastness of the transfer images. The hydrophobic matter may, for example, be the porous hydrophobic matter described above. This structure combines relatively good resistance to damage on manipulation with relatively easy transfer properties. This may probably be accounted for by the lateral pressure exerted on the porous hydrophobic matter during the transfer operation, which lateral pressure cannot laterally shift the porous hydrophobic matter located between the elevations, which for that very reason conduces to loosening the porous hydrophobic matter from the support.

In another embodiment of a light-sensitive screen sheet according to the invention, the matter to be imagewise transferred contains a thermosetting resin. When, as described later, the image has been transferred to a receiving printing plate, and when the resulting printing plate is heated after transfer, the resin will set and enhance the resistance of the printing plate. Examples of suitable thermosetting resins are the lower polymers of urea-formaldehyde resin, of phenol-formaldehyde resin, of melamine-formaldehyde resin, and the like.

The examples which follow illustrate some of the numerous methods for the manufacture of the light-sensitive screen sheets described above.

A particularly useful aspect of the process according to the invention is directed to the production of graphic prints. In order to obtain the necessary printing plate, the transfer is then effected on a receiving printing plate. After the separation of the two surfaces the printing plate is finished for making graphic prints, and from the finished printing plate graphic prints are made.

Examples of receiving printing plates have already been given above. In this embodiment of the invention, as in United States Patent No. 1,618,505, the sensitizing of printing plates is superfluous. In the finishing operation, accordingly, no matter (e.g. unexposed matter) need be removed from the printing plate, generally a somewhat tedious operation for those who are not particularly skilled in photomechanical work. When the invention is applied to intaglio printing, removal of superfluous matter is also unnecessary. In the known process of planography such an operation sometimes may be avoided, but only when the planographic printing is carried out in the dark. It is one of the merits of this embodiment of the invention that it considerably simplifies the production of planographic printing plates; it thus brings photomechanical processing more within the reach of the unskilled. This is particularly important in the offset printing process which, in offices and the like, is usually carried out by relatively unskilled personnel. For this form of planography, therefore, the invention is of outstanding importance. Since the original is copied by screen reflectography, the process of the invention yields non-laterally reversed offset prints.

An especial advantage of this embodiment of the invention, which is generally obtained, is that the image present on the printing plate after transfer (even before finishing) is nearly always very easy to retouch. Accordingly, retouching is preferably carried out between transfer and finishing. The possibility of such easy retouch does not normally exist in processes using sensitized printing plates.

The finishing of the printing plate may consist in etching the open portions of the plate for intaglio printing or in deepening the open portions by etching and/or mechanical means, the transferred image portions serving as a resist. When the printing plate is to be used for the making of planographic prints, the finishing operation may consist in making the open portions of the printing plate more water-receptive before inking. With zinc and aluminium plates this may e.g. be achieved by treating them with a "fixing" solution, for example a solution of phosphoric acid and gum arabic.

Examples of other finishing treatments for planographic printing plates are the following. The portions of a metal printing plate not covered with transferred matter may be etched chemically or electrolytically in order to enhance their water-receptivity; for the same purpose, a layer of another metal may be formed on the open portions. However, if copper, for example, is deposited on the open portions of a planographic steel plate, and the transferred matter is subsequently eliminated, a printing plate is obtained in which the portions corresponding to the transferred portions are water-receptive, whilst the portions corresponding to the non-transferred portions are greasy printing ink-receptive. By this finishing operation the selective receptivity of the printing plate is as it were reversed.

When the printing plate is a bi-metal plate with a greasy printing ink-receptive upper layer, finishing is achieved after the transfer by treating the surface of the plate with a chemical which takes the thin upper metal layer from the bi-metal plate. In this procedure the transferred matter functions as a resist. It may be allowed to remain on the printing plate, or may be removed, because the upper metal layer of the bi-metal plate is greasy printing ink-receptive per se. In another finishing operation, which is analogous to a well-known reversal process, the transfer image on a water-receptive printing plate, after having dried, may be rubbed over or coated with an asphalt solution and then dried. Thereupon the transferred matter is eliminated from the surface, so that in the portions which immediately after the transfer were covered with transferred matter, the original receiving surface (which is water-receptive) will eventually reappear.

When printing plates are made in this manner, there may usefully be employed a light-sensitive screen sheet of which the (light-pervious) support is dimensionally stable against wetting with the liquid used in the transfer. The screen side, and even the other side of the support, may nevertheless be hydrophilic. The receiving printing plate (which later will become printing plate) will almost inevitably be dimensionally stable against wetting since this is usually an essential requirement for such a printing plate. When the light-sensitive screen sheet is dimensionally stable, the full advantage of true-to-scale printing is obtained. As supports dimensionally stable against wetting there may be used, for example, a glass plate, a sheet of glass cloth or a sheet of a transparent artificial resin.

When the process according to the invention is used for making planographic printing plates intended to provide a large number of prints i.e. "long-run" plates it will generally be necessary to subject the printing plate in the finishing operation to a treatment which will improve the resistance of the transferred matter to the planogrhpaic printing operations. This amounts, in practice, to strengthening the linkage between transferred matter and printing plate so that it is stronger than the linkage existing after the mere transfer operation (the previously described ease of retouch is due to the relative weakness thereof), i.e. strong enough to resist the repeated damping and taken up and delivering of printing ink in the planographic printing process. The resistance may thus be improved, for example, by subjecting the printing plate to high pressures. The resistance may, however, also be enhanced by covering the transferred matter with substances resistant to water.

In an embodiment directed to the making of long-run planographic printing plates the printing plate is heated in order to improve said resistance (compare the enhancement of the resistance of a printing plate by heating, described in the British Patent No. 678,599). By the heating the operation, the greasy printing ink-receptivity of the transferred image portions may at the same time be improved.

In another embodiment, likewise directed to the making of long-run planographic printing plates, the matter transferred to the surface of the printing plate contains a tannable substance and in order to improve said resistance said substance is tanned. In the case of gelatin, for example, a treatment with formaldehyde, alum, chrome alum, and other known tanning agents is appropriate.

In yet another embodiment, also directed to the making of such long-run planographic printing plates, the matter transferred to the surface of the printing plate contains a diazo compound capable of forming hydrophobic azo dyestuffs and in order to improve said resistance a hydrophobic azo dyestuff is formed from that diazo compound by treatment with a buffered solution of an azo dyestuff coupling component.

In the production of such long-run planographic printing plates it is also possible to provide that the matter transferred to the surface of the printing plate contains a diazo compound and an azo dyestuff coupling component, which on being coupled with one another will form a hydrophobic azo dyestuff; in order to improve said resistance, the printing plate is then subjected to a treatment with ammonia fumes.

According to yet another embodiment directed to the making of such long-run planographic printing plates, the matter transferred to the surface of the printing plate contains light-sensitive matter the water-receptivity of which decreases on exposure to light, and in order to improve said resistance the printing plate is exposed. This same procedure can also be applied with advantage to transfer images on surfaces other than printing plate surfaces. In most cases in which unexposed light-sensitive matter is transferred, such unexposed light-sensitive matter will automatically fulfil the above-mentioned requirements. When the receiving sheet, e.g. the receiving printing plate, is pervious to light, the exposure may be carried out from the rear.

Figure 9:
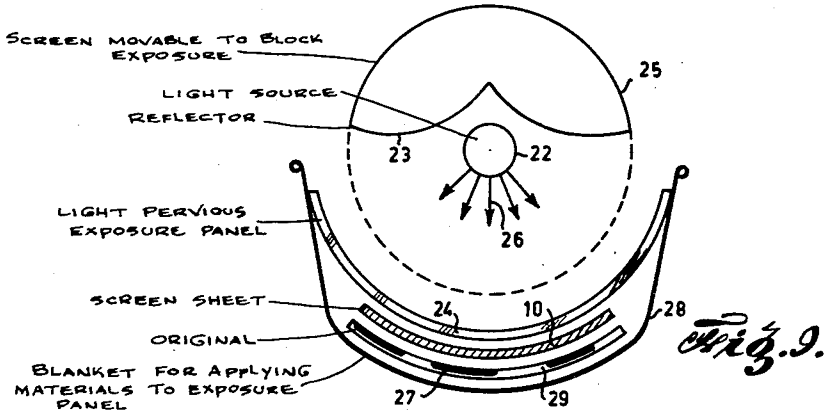
FIG. 9 illustrates the situation on imagewise exposure.

FIG. 9 is a diagrammatic cross-section of a copying apparatus, in which 22 is a high-pressure mercury vapour lamp, having, for example, a length of 42 cm. and a power of 700 watts, 23 an aluminium reflector, and 24 a segment of a glass cylinder with an outer diameter of 19 cm. By means of a shade 25, rotatable about its axis through the path indicated by a dotted line, the surface to be exposed can be shaded from the light beams 26. The screen sheet 10 to be exposed in the manner of screen reflectography, together with the original 29 with image portions 27, is pressed by means of the blanket 28 against the outside of the glass-cylinder in order to achieve the required contact between light-sensitive screen sheet and original, and with opened shade 25 is irradiated from lamp 22 through cylinder 24. The apparatus may likewise be used for the finishing by exposure of flexible printing plates as described above.

Preferably, according to the invention, the original from which the printing plate is to be made should not contain areas of continuous tone.

The pressing-together necessary for transfer will preferably be carried out in such a way that the two cooperating sheets (exposed screen sheet and receiving sheet or receiving printing plate) are laid on each other, with the transfer liquid in between, and then pressed together by means of at least one pressing roller. In this manner the occurrence of air bubbles and similar difficulties, which may occur in other compressing methods, is avoided.

Figure 10:
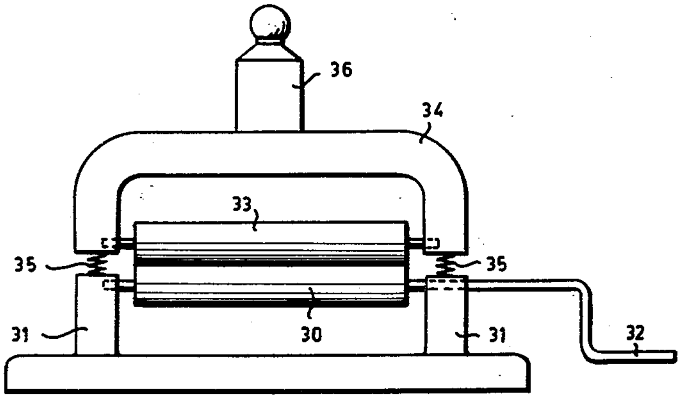
FIG. 10 illustrates an apparatus for pressing-together the exposed light-sensitive screen sheet and receiving support in the transfer operation.

FIG. 10 diagrammatically represents a simple apparatus, suitable for such pressing-together of an exposed screen sheet and a receiving sheet, e.g., a receiving printing plate. Rubber roller 30 is mounted in the bearings 31 on the base, and is driven by means of crank 32. The rubber roller 33 is mounted on both sides in frame 34, which is supported on its sides (not shown). The springs 35 neutralize the weight of roller 33 and frame 34. On top of frame 34 a weight 36 is placed, which weight will determine the pressure of roller 33 on roller 30. The rubber rollers have, for example, a length of 280 millimeters, a diameter of 40 mm., and a hardness of 75 Shore.

Although in general the transfer is carried out at room temperature, in certain cases application of heat in the transfer may be useful. Preferably this heat will be applied to the rollers by means of which the transfer surfaces are pressed together. In certain circumstances this will result in better transfer, and it has, at the same time, the advantage that part of the transfer liquid is eliminated by evaporation.

Figure 11:
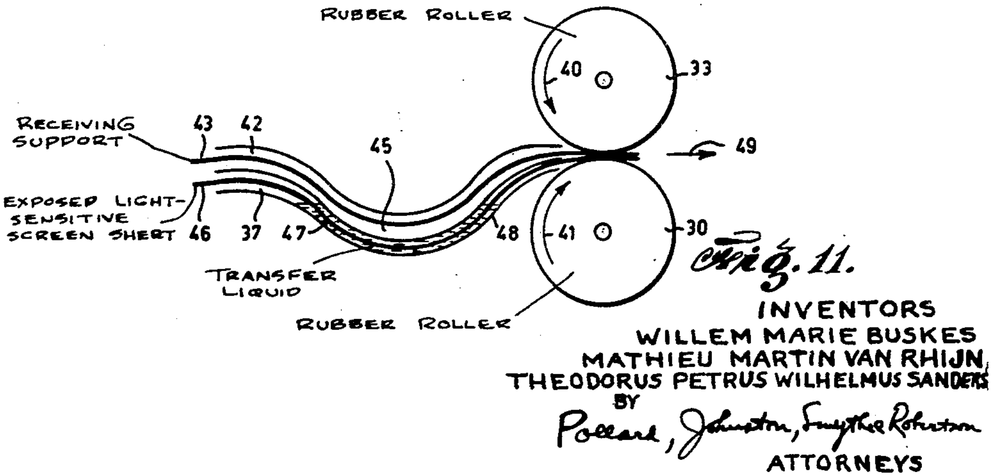
FIG. 11 illustrates a transfer apparatus for combined wetting and pressing-together.

FIG. 11 is a diagrammatic cross-section of a transfer apparatus for the combined wetting and pressing-together previously described. Two pressing rollers are indicated by 30 and 33; they rotate according to arrows 40 and 41. The pressing rollers 30 and 33 have, for example, a diameter of 40 mm., a length of 280 mm., and a hardness of 75 Shore. They exert a pressure on each other which can be adjusted to the requirements of a given transfer operation, carried out with a given exposed screen sheet and a given receiving sheet or a given receiving printing plate. Exposed screen sheet 46 is inserted via slot 37 and is conveyed through the liquid 47, which is contained in trough 48, to reach the pressing zone between rollers 30 and 33. Its imagewise exposed surface is turned upward. Measured along the travelling path of the sheet, the distance between the place where it is immersed and the pressing zone is 10 cm. The receiving sheet or printing plate 43 is inserted into the apparatus via slot 42 with its receiving surface downward, and is conveyed through slot 45, not filled with liquid. The two sheets meet in the pressing zone, are joined there, leave the apparatus in the direction of arrow 49, and may be separated by hand.

When in a given case it is desirable to wet the receiving surface instead of the exposed screen sheet, the situation remains as indicated in FIG. 11, with the difference, however, that now 46 denotes the receiving sheet or the receiving printing plate, with the receiving surface turned up, and 43 the exposed screen sheet, with the exposed side down.

Slot 45 also may be filled with liquid (the same as that in trough 48 or a different one), so that both sheets are wetted.

The separation of the exposed screen sheet from the receiving sheet or the printing plate may as a rule be carried out shortly after they have been pressed together.

In the above discussion certain condensation products of diazo compound with formaldehyde are already mentioned, which yield light-decomposition products which are probably capable of polymerizing. These light-decomposition products are insoluble and have no transferability, but when the transfer is carried out with a suitable previously wetted receiving support or planographic printing plate, the transfer will take place from the unexposed image portions carrying the diazo compound. In this case the light-sensitive matter may consist of the diazo compound and a binder which does not participate in the transfer, e.g., a diacylated cellulose ester (not participating in transfer with water). When the receiving support is a receiving printing plate for planographic printing, the plate after separation is finished by exposure. In the image portions containing the diazo compound, the abovementioned polymerizing light-decomposition product will be formed, and it will make these portions of the planographic surface greasy printing ink-receptive and resistant to etching.

As already stated, most of the examples are based on the use of one and the same diazo compound. This is the condensation product of p-diazo-diphenylamine and formaldehyde, prepared according to Example I of the Netherlands Patent No. 35,480. In the examples this diazo compound, for the sake of brevity, will each time be referred to as "diazo aldehyde." The examples serve to illustrate various embodiments of the invention, and owing to the use each time of the same diazo compound, the respective results of the examples become comparable with each other. Apart from this, other compositions of the light-sensitive matter are used in a few examples.

Likewise for the sake of brevity, the terms "cellulose acetate sheet" and "gelatin" are used without any further indication. By "cellulose acetate" sheet is to be understood a sheet having a acetyl content corresponding to about 50% by weight of combined acetic acid (the same consideration applies to a cellulose acetate layer); if not otherwise indicated, the sheet will have a weight of 80 g./sq. metre. By "gelatin" without any further indication there is to be understood the Super Photo JO–5 type. This acetate sheet and this gelatin are merely examples of numerous suitable qualities. In the examples only one quality of each is used, in order to make the results more readily comparable with one another.

The same consideration applies to "carbon black" and "asphalt." By way of example, carbon black of the Kosmos–20 type, was always used; the asphalt used was always of the Ennjay, oxidized asphalt, 285/300 M.P. type. The same consideration applies to the term "transparent paper"; likewise for the reasons mentioned, "transparent paper" No. S–1582 Super Transparent of 90 g. per sq. metre was always used.

Likewise for the sake of brevity and for better comparison, the examples merely refer to "deacylation" of cellulose acetate surfaces without any further indications. This deacylation was carried out as follows:

The cellulose acetate sheet was immersed for 1 sec. and at a temperature of 28° C. in a solution of:

600 cc. ethyl alcohol
50 cc. water
43 g. potassium hydroxide

The sheet was subsequently dried so as to be dry after exactly 20 sec.; thereupon it was immersed for 1.5 sec., this time at a temperature of 27° C., in the following liquid:

600 cc. ethyl alcohol
300 cc. water
72 g. potassium hydroxide and it was now dried so as to be dry after exactly 10 sec. It was subsequently washed in running water for 30 sec., and immediately afterwards immersed for 7.5 sec. at room temperature in a solution of the following composition:

600 cc. ethyl alcohol
3150 cc. water
75 g. oxalic acid

The sheet was then dried so as to be dry after exactly 12 sec.

This is one of numerous deacylation methods, and it is referred to as "deacylation" in the examples.

As already stated, the copying is effected in the manner of screen reflectography, and in the examples it is carried out in the apparatus of FIG. 9; a page of good printed matter serves as the original.

In some examples a receiving printing plate is used, referred to as "finely grained aluminium printing plate," for which in those examples an aluminium sheet commercially known as "Rotaprint E–RKL 2 Sorte" was used. It is one of the many suitable planographic metal sheets. In other examples a receiving printing plate made of paper was used, commercially known as "Rotamasta Blue." It is one of the many suitable planographic papers, and in the examples it is referred to as "paper receiving printing plate."

The wetting operations in the examples, for whatever purpose, when not otherwise indicated, are carried out with water.

In the examples the apparatus of FIG. 10 or that of FIG. 11 is used for the pressing-together. The travelling speed through either of these apparatuses is referred to as "transfer speed" (in metres per minute). The "transfer pressure" is indicated in kg. per lineal cm. of the pressing rollers.

In the examples the mutual center distance of the light impervious screen portions is referred to as "center distance 9" (compare FIG. 4). The ratio of the aggregate surface area of the light-pervious screen portions to the total surface area of the screen is referred to as "light transmission" and is defined as a percentage.

Where in the examples a screen sheet according to FIGS. 6 and 7 is referred to, there is meant a light-sensitive screen sheet of which the support 3 showing the relief always consists of cellulose acetate.

The screen relief is obtained by making the surface mouldable, e.g. by heating or wetting with a solvent such as acetone. Thereupon the relief of FIGS. 6 and 7 is embossed. In the examples referred to above, the "height" of the elevations is approximately 10 microns. It might be lower or higher, but it was found that in practice a "height" less than 5 microns or greater than 15 microns is not very desirable.

The light-impervious screen portions 1 (FIG. 7) are formed in the recesses 20 by filling them sparingly with a finely ground suspension of:

200 g. carbon black and
80 g. asphalt in
1000 cc. xylene which, on drying, firmly adheres to the bottom of the recesses. On drying the impervious screen matter retracts into the recesses and forms a deposit which (as illustrated in FIG. 7) does not fill the recess completely. After drying, the elevations 21 may be cleaned with soft smooth leather.

The support of the sheet need not consist of cellulose acetate throughout, like the one referred to above, but may just as well (for the sake of simplicity this is not shown) consist of a transparent support, such as transparent paper, cellulose hydrate, polyvinyl acetate, or even glass, carrying a cellulose acetate layer. The relief is then made in this layer.

When in the examples offset prints are made, wherever not otherwise indicated, this is done by means of the "Rotaprint RKL Office Offset Printer," equipped with automatic damping installation. The finished printing plate is mounted in this offset machine, the imageside of the plate is washed with a wet sponge, damped and inked a few times, and then prints are made.

The printing ink used in the examples is always "Rotaprint printing ink, Black, RF 991 type."

It is obvious, that the use of one single type of the materials and the application each time of one single method in the examples is not to be understood as a limitation on the scope of the invention in any respect whatsoever.

*Example 1*

A cellulose acetate sheet of 500 g./sq. metre is superficially wetted with acetone, thus made mouldable, and pressed against a hardened gelatin screen matrix with crossed channels encircling screen cupolas. After having been removed from the matrix, the surface of the cellulose acetate sheet has an intaglio relief of a structure as used in intaglio printing. Center distance 9: 80 microns. Depth of the screen cells: approximately 12 microns. The intaglio screen surface is deacylated and mounted about a metal cylinder, with said surface outwards. The intaglio relief of the cylinder is covered with a layer of a finely ground pigment suspension of the following composition:

250 g. carbon black
50 g. asphalt
1000 cc. xylene

It is then dried, and the elevations of the relief are cleaned with a rotating flannel disc. The dry black pigment matter is only left in the screen cells of the cylinder. A sheet of transparent paper, provided with a gelatin layer of about 3 g./sq. metre is wetted and immediately pressed against the cylinder with its wetted gelatin side. With its adhesive gelatin layer it takes over the dry pigment matter from the cells of the screen relief. When leaving the cylinder, the transparent paper carries a screen with a light transmission of 10%. The screen side of the transparent paper is coated with:

30 g. cellulose acetate butyrate of the AB/500/1 type in
1000 cc. ethyl acetate and dried. A cellulose acetate butyrate layer of approximately 1–2 g./sq. metre is formed, which covers the screen and strongly affixes it to the transparent paper. The light-sensitive layer is formed by casting at 40° C.;

80 g. gelatin and
20 g. diazo aldehyde in
1000 cc. water and drying. The weight of the layer averages 2.7 g./sq. metre. The layer is water-receptive, swellable with water, and becomes adhesive on wetting with water. Thus the light-sensitive screen sheet has a structure according to FIGS. 1 and 5. Exposure: 90 sec. Receiving support: finely grained aluminium printing plate. Transfer operation: in the apparatus according to FIG. 11; the receiving printing plate is wetted. Transfer speed: 1 m. Transfer pressure: 2 kg. Separation: shortly after pressing-together. The transfer image formed on the printing plate is a hardly visible yellow positive.

Finishing: The plate is exposed for 60 sec. with the image side turned towards the light-source, and then treated for 30 sec. with:

150 g. gum arabic
900 cc. water
27 cc. phosphoric acid
0.5 g. carbolic acid and dried. In the following examples this phosphoric acid gum arabic solution will be referred to as "fixing solution." With the finished printing plate, positive offset prints are obtained.

*Example II*

On the unsensitized screen sheet according to Example I a light-sensitive layer is formed by casting:

80 g. gelatin
20 g. diazo aldehyde and
40 g. Heliogene Blue B in
1000 cc. water and drying. The weight of the layer averages 2.5 g./sq. metre. The layer is water-receptive, swellable with water, and becomes adhesive on wetting with water. Exposure: 120 sec. Receiving support: white art paper. Transfer operation: in the apparatus according to FIG. 11 the imagewise exposed screen sheet is wetted. Transfer speed: 2.5 m. Transfer pressure: 2 kg. Separation: shortly after pressing-together. The transfer image formed is a positive blue-green coloured reproduction of the original. Upon sufficient after-exposure, the colour shifts to blue. At the same time the fastness of the transfer copy to washing is improved by after-exposure.

*Example III*

A sheet of clear, colourless cellulose hydrate film of 60 g./sq. metre is sensitized by soaking for 10 min. in:

500 g. green ferric ammonium citrate in
1000 cc. water

It is smoothed on a clean, smooth glass plate, and then dried. After drying it is removed from the glass plate and placed in close contact with a screen of a structure as indicated in FIG. 5, with a light transmission of 90% and a center distance 9 of 85 microns. It is exposed through the screen with an arc lamp (18 amperes and 220 volts) at a distance of 1.5 m. Exposure: 60 min. The exposed sheet is immersed for 30 sec. in:

40 g. silver nitrate in
200 cc. ethyl alcohol and
800 cc. distilled water and then washed for 10 min. in running water. It is subsequently immersed for 30 sec. in:

10 g. sodium thiosulphate in
1000 cc. water and again washed in running water for 15 min. Thereupon it is again smoothed on a clear, smooth glass plate, and then dried. After drying the screen sheet formed is removed from the glass plate. It has the structure of FIG. 6 and a light transmission of approximately 10%. The light-impervious screen portions extend throughout the thickness of the screen sheet.

On one side of the still unsensitized screen sheet thus obtained is cast at 35° C.:

80 g. gelatin
20 g. diazo aldehyde
20 g. magnesium sulphate in
1000 cc. water and the sheet is dried. The light-sensitive layer obtained weighs approximately 3 g./sq. metre. It is water-receptive, swellable with water and becomes adhesive on wetting with water. Exposure: 90 sec. Receiving support: finely grained aluminum printing plate. Transfer operation: the receiving printing plate is immersed and pressed together with the imagewise exposed screen sheet. Transfer speed: 1 m. Transfer pressure: 2 kg. Separation: shortly after pressing-together. The transfer image formed on the printing plate is a hardly visible yellow positive.

Finishing: in the manner of Example I. With the finished printing plate, positive offset prints are obtained. The cellulose hydrate screen sheet described above has a hydrophilic screen surface. A layer of porous hydrophobic matter may be formed on it by thinly coating it with:

100 g. Victoria Blue
25 g. cellulose acetate butyrate
1000 cc. ethyl acetate and drying. A light-sensitive layer is formed on it by casting the sensitizing mixture referred to above, and drying. The light-sensitive layer has the properties indicated above. Exposure: 90 sec. Receiving support: finely grained aluminum printing plate. Transfer operation: the receiving printing plate is immersed and pressed together with the imagewise exposed screen sheet. Transfer speed: 1 m. Transfer pressure: 3 kg. Separation: shortly after pressing-together. The transfer image formed on the printing plate is a blue positive. If necessary, it is retouched. Finishing: it is kept for 3 min. at 140° C., cooled, treated with fixing solution, and dried.

With the finished printing plate, positive offset prints are obtained.

For making the screen sheet, a highly contrasting silver halide film material, e.g. Gevaert Process Ortho film, may be used instead of the cellulose hydrate sheet sensitized with green ferric ammonium citrate. After exposure in contact with a screen, photographic development, fixation and washing, the screened film obtained is dried, then evenly coated with a 10% by weight solution of cellulose acetate (with an acetyl content of approximately 50% by weight of combined acetic acid) in a mixture of equal parts by volume of acetone and methyl glycol acetate, and dried again. The sensitizing mixture mentioned above is then cast on the screened side. The light-sensitive screen sheet thus obtained is used in the same manner as the sensitized cellulose hydrate screen sheet described above.

*Example IV*

One side of a sheet of clear, colourless celluloid is superficially wetted with acetone, thus made mouldable and pressed against a hardened gelatin screen matrix with crossed channels encircling screen cupolas. After the celluloid sheet has been removed from the matrix, the surface of the sheet has an intaglio relief of a structure as used in intaglio printing. Center distance 9: 80 microns. Depth of the screen cells: approximately 10 microns. The aggregate surface of the screen cells averages about 90% of the total surface. With its relief side turned downwards, the sheet is floated on a liquid obtained by mixing:

(*a*) 330 cc. of a 10% by weight solution of thiourea
(*b*) 330 cc. of a 20% by weight solution of potassium hydroxide
(*c*) 330 cc. of a 10% by weight solution of lead acetate Solutions (*a*) and (*b*) were mixed first and immediately afterwards solution (*c*) was added. After approximately 6–8 min. a thin layer of lead sulphide has been formed on the relief side of the celluloid sheet. If necessary, the operation may be repeated by rinsing the celluloid sheet in distilled water and subsequently floating it again on a fresh mixture of the above-mentioned liquids. As soon as the thickness of the layer is sufficient, the sheet is rinsed in luke-warm water, and dried. The lead-sulphide layer is then cleaned away from the elevations of the screen relief by means of very finely divided polishing powder and a cotton brush rotating at high speed. Thus a screen has been formed of a structure like that of FIG. 5, in which the impervious screen portions 1 appear as recesses. The screen side is cleaned with a sponge wetted with a mixture of equal parts of alcohol and water, and after drying is coated with:

40 g. gelatin
20 g. magnesium sulphate
20 g. diazo aldehyde
20 g. carbon black
1000 cc. water and dried again. The weight of the light-sensitive layer averages 4 g./sq. metre. The layer is thin on the light pervious elevations of the screen and has greater thickness in the recesses (compare FIG. 7). It is water-receptive, swellable with water, and becomes adhesive on wetting with water. Exposure: 150 sec. Receiving support: white art bookpaper. Transfer operation: in the apparatus according to FIG. 11; The screen sheet is wetted. Transfer speed: 2.25 m. Transfer pressure: 2 kg. Separation: shortly after pressing-together. The transfer image on the receiving sheet is a black, sharp positive reproduction of the original. The water-fastness of the transfer image is improved by exposure with actinic light.

*Example V*

Screen sheet according to FIGS. 6 and 7. Center distance 9: 90 microns. Light transmission: 10%. The light sensitive layer was formed by casting:

80 g. gelatin
20 g. diazo aldehyde
20 g. magnesium sulphate
40 g. Lithol Echtscharlach R.N. Pulver in
1000 cc. water and drying. The weight of the layer averages 3.5 g./sq. metre. The layer is water-receptive, swellable with water and becomes adhesive on wetting with water. It has close contact with the tops of the relief. Exposure: 150 sec. Receiving support: a sheet of white art paper. Transfer operation: in the apparatus according to FIG. 11; the imagewise exposed screen sheet is wetted. Transfer speed: 2.5 m. Transfer pressure: 1 kg. Separation: shortly after pressing-together. The transfer image formed is a positive red-coloured reproduction of the original.

If in the sensitizing liquid Lithol Echtscharlach R.N. Pulver is replaced by Hans Yellow 10–G, and transparent paper is used as receiving support, copies may be made from the transfer image.

If a soluble dyestuff is used in the sensitizing solution, the receiving support is wetted on transfer instead of the screen sheet.

*Example VI*

Screen sheet according to FIGS. 6 and 7. Center distance 9:40 microns. Light transmission: 8%. The light-sensitive layer was formed by casting:

40 g. gelatin
15 g. diazo aldehyde in
1000 cc. water and drying. The weight of the layer averages 3.2 g./sq. metre. The layer is water-receptive, swellable with water, and becomes adhesive on wetting with water. Exposure: 150 sec. Receiving support: a sheet of white art paper. Transfer operation: in the apparatus according to FIG. 11; the imagewise exposed screen sheet is wetted. Transfer speed: 2.5 m. Transfer pressure: 1 kg. Separation: shortly after pressing-together. The transfer image formed is a hardly visible yellow positive. It is developed with:

30 g. thiourea
5 g. phloroglucinol
2 g. sodium salt of isopropylnaphthalene sulphonic acid
20 g. sorbitol
18 g. potassium tetraborate (5 mols water of crystallisation)
32 g. potassium metaborate in
1000 cc. water during which treatment an azo dyestuff image is obtained.

The transfer may also be carried out on a finely grained aluminium printing plate.

Finishing: the transfer image on the printing plate is treated with the "developing liquid" described above. After rinsing with water and drying, the printing plate is treated with fixing solution and dried again. With the finished printing plate, positive offset prints are obtained.

Instead of finishing with the developing liquid, the printing plate may be finished either by exposure for 120 sec. or by heating at 150° C. for 10 min., treating with fixing solution, and drying.

Before the "finishing," the printing plate may be reversed in the following way: the plate is coated with a thin layer of a 10% by weight solution of asphalt in xylene, and dried; after drying, the transfer image, together with the overlying thin asphalt layer, is removed from the surface by rubbing with water and a sponge at 30–35° C. With the thus finished printing plate, negative offset prints are obtained.

A negative printing plate is likewise obtained by transferring the remnant image, left behind on the original light-sensitive screen sheet after the transfer operation previously described in this example, to a finely grained aluminium printing plate. Transfer operation: after wetting, the screen sheet, which carries the remnant image, is pressed against the receiving printing plate; the printing plate and the screen sheet are kept in contact with one another for some time, and then separated; after separation, a faintly visible negative transfer image has been formed on the receiving printing plate. Finishing: exposure or heating: subsequently a treatment with fixing solution.

A negative printing plate is likewise obtained in the following way: Receiving support: finely grained aluminium printing plate. Transfer operation: the imagewise exposed screen sheet is immersed for 30 sec. in water at 35° C., and pressed against the receiving printing plate. Transfer speed: 2.5 m. Transfer pressure: 1 kg. Separation: some time after pressing-together. Finishing: the plate is kept for 10 min. at 150° C., treated with fixing solution, and dried. With the finished printing plate, negative offset prints are obtained.

The reversal of the printing plate described above, and the methods described for the making of a negative printing plate, may be applied to advantage in cases in which positive prints are required to be obtained from a negative original.

*Example VII*

Screen sheet according to FIGS. 6 and 7. Center distance 9: 50 microns. Light transmission: 6%. The light-sensitive layer was formed by casting:

80 g. gelatin
20 g. diazo aldehyde
20 g. magnesium sulphate
40 g. Heliogene Blue B
1000 cc. water and drying. The weight of the layer averages 3 g./sq. metre. The layer is water-receptive, swellable with water, and becomes adhesive on wetting with water. The light-sensitive screen sheet is made dimensionally stable against wetting with water in the following way: Its back surface is made adhesive by coating it with the copolymer emulsion of butyl acrylate and vinyl acetate–Acronal 500D, and drying. A similar dry adhesive layer is applied on one side of a colourless transparent Vinylite sheet of a thickness of 0.25 mm. The two sheets are pressed together under high pressure at 50° C., with their adhesive sides turned towards each other. The sheets are thus united to one dimensionally stable, light-sensitive screen sheet. Exposure: 150 sec. Receiving support: finely grained zinc printing plate. Transfer operation: in the apparatus according to FIG. 11; the imagewise exposed screen sheet is wetted. Transfer speed: 1.5 m. Transfer pressure: 2 kg. Separation: shortly after pressing-together. The printing plate formed is a blue positive. If necessary, it is retouched. Finishing: the zinc printing plate is kept for 5 min. at 125° C.; after cooling, it is treated with fixing solution and dried. With the finished printing plate, positive offset prints are obtained. The dimensions of the prints do not differ substantially from those of the original.

A superficially deacylated cellulose acetate sheet of sufficient thickness to render it dimensionally stable against wetting may also be used as receiving printing plate. Transfer operation: the imagewise exposed screen sheet and the receiving printing plate are both wetted immediately before the pressing-together. Separation: shortly after pressing together. Finishing: the cellulose acetate sheet carrying the positive transfer image is exposed for 30 sec. With the finished sheet, positive offset prints are obtained. The dimensions of the prints do not differ substantially from those of the original.

The transfer operation may also be carried out on an aluminium or zinc printing plate with a smooth surface. Finishing: the plate is heated for approximately half an hour to 125° C.; after cooling, its image side is subjected to a fine sand-blasting treatment (the transfer image remains intact while the uncovered portions of the metal surface are finely grained), rinsed, and inked. With the finished printing plate, positive offset prints are obtained. The dimensions of the printed matter do not differ substantially from those of the original.

Instead of the receiving printing plates described, a lithographic stone may be used as receiving printing plate. After the imagewise exposed screen sheet, has been wetted, it is pressed against the stone by means of a hand roller. Separation: shortly after pressing-together. If necessary, the stone is retouched. Finishing: the lithographic stone carrying the positive transfer image is heated for about 10 min. to 150° C.; after cooling, the image side is treated with a solution of 2.5% by weight of gum arabic in water and inked. Thereupon ordinary planographic prints are made from the lithographic stone. The dimensions of the printed matter do not differ substantially from those of the original. The prints are laterally reversed with respect to the original.

*Example VIII*

Screen sheet according to FIGS. 6 and 7. Center distance 9: 50 microns. Light transmission: 10%. The light-sensitive layer was formed by casting:

75 g. polyvinyl acetate of the "Elvanol" type, grade 50–42, 86–89% hydrolyzed
15 g. diazo aldehyde in
100 cc. ethyl alcohol and
900 cc. water and drying. The weight of the layer averages 3 g./sq. metre. The layer is water-receptive, swellable with water, and becomes adhesive on wetting with water. Exposure: 200 sec. Receiving support: paper receiving printing plate. Transfer operation: in the apparatus according to FIG. 11; the receiving printing plate is wetted (with water or with water to which 10% of ethyl alcohol has been added). Transfer speed: 2 m. Transfer pressure: 2.5 kg. Separation: shortly after pressing-together. The printing plate formed shows a hardly visible positive image. Finishing: the plate is exposed for 150 sec. and treated with fixing solution.

With the finished printing plate, positive offset prints are obtained.

*Example IX*

Screen sheet according to FIGS. 6 and 7. Center distance 9; 50 microns. Light transmission: 10%. The light-sensitive layer was formed by casting:

80 g. gelatin
20 g. diazo aldehyde
20 g. p.benzoylamido-2.5-diethoxy benzene diazonium chloride zinc chloride double salt.
2.5 g. oxalic acid
2.5 g. beta-hydroxy-ethylamide of beta-hydroxy-naphthoic acid in
1000 cc. water and drying. The weight of the layer averages 3.5 g./sq. metre. The layer is water-receptive, swellable with water, and becomes adhesive on wetting with water. Exposure: 200 sec. Receiving support: finely grained aluminum printing plate. Transfer operation: in the apparatus according to FIG. 11; the receiving printing plate is wetted. Transfer speed: 2 m. Transfer pressure: 1.5 kg. Separation: shortly after pressing-together. The transfer image formed on the printing plate is hardly visible. Finishing: the plate is kept for 5 min. in concentrated ammonia fumes, rinsed with water, and dried. The printing plate shows a blue-purple positive image, and is treated with fixing solution and dried.

With the finished printing plate, positive offset prints are obtained.

If a sheet of paper is used as receiving support, the transfer image on this may likewise be developed with ammonia fumes to a positive blue-purple image.

*Example X*

Screen sheet according to FIGS. 6 and 7. Center distance 9: 50 microns. Light transmission: 10%. The light-sensitive layer was formed by casting:

80 g. gelatin
18 g. p.ethylamino-benzene diazonium chloride zinc chloride double salt in
1000 cc. water and drying. The weight of the layer averages 3.5 g./sq. metre. The layer is water-receptive, swellable with water, and becomes adhesive on wetting with water. Exposure: 450 sec. Receiving support: a sheet of white, smooth writing paper. Transfer operation: the receiving support is soaked in a 3% by weight solution of gum arabic in water; thereupon the superfluous liquid is squeezed off between rubber rollers, and then the plate is pressed together with the imagewise exposed screen sheet. Transfer speed: 2 m. Transfer pressure: 1.5 kg. Separation: shortly after pressing-together. The transfer image formed is a yellow positive of the original. It is not fast to light and may be fixed by treating it with:

20 g. thiourea
6 g. phloroglucinol
6 g. resorcinol
2 g. isopropylnaphthalene sulphonic acid sodium salt
30 g. beet sugar
18 g. potassium tetraborate (5 mols water of crystallisation)
32 g. potassium metaborate in
1000 cc. water After drying, a positive, brown-coloured image is thus obtained.

Analogous results are obtained if 20 g. p-N-ethyl-N-beta-hydroxyethylamino-benzene diazonium chloride zinc chloride double salt or 15 g. p-N-ethyl-N-beta-diethylaminoethyl-aminobenzene diazonium chloride zinc chloride double salt are used in the sensitizing solution instead of 18 g. of the diazo compound recited therein.

*Example XI*

Screen sheet according to FIGS. 6 and 7. Center distance 9: 50 microns. Light transmission: 25%. The light-sensitive layer was formed by casting:

20 g. p-benzoylamido-2.5-diethoxy benzene diazonium chloride zinc chloride double salt
80 g. gelatin
20 g. Bordeaux Red
1000 cc. water and drying. The weight of the layer averages 3.5 g./sq. metre. The layer is water-receptive, swellable with water, and becomes adhesive on wetting with water. Exposure: 150 sec. Receiving support: a sheet of white writing paper. Transfer operation: the imagewise exposed screen sheet is immersed for a few seconds in:

15 g. 2.3-dihydroxynaphthalene
100 g. sodium carbonate in
1000 cc. water

It is then rinsed with water and pressed together with the receiving paper. Transfer speed: 2.5 m. Transfer pressure: 1 kg. Separation: shortly after pressing-together. The transfer image formed is a red-coloured negative reproduction of the original.

*Example XII*

Screen sheet according to FIGS. 6 and 7. Center distance 9: 50 microns. Light transmission: 10%. The screen side was provided with a protective coating by casting:

10 g. cellulose acetate of medium viscosity with an acetyl content, expressed as combined acetic acid, of about 50% by weight in
1000 cc. acetone and drying. The cellulose acetate layer of approximately 2 g./sq. metre obtained was superficially sensitized with:

20 g. diazo aldehyde in
500 cc. water and
500 cc. acetone dried, and exposed until all the diazo aldehyde had been decomposed. On the protective layer thus formed, the light-sensitive layer was formed by casting:

10 g. cellulose acetate as indicated above in
1000 cc. acetone drying, superficially sensitizing with:

20 g. diazo aldehyde in
500 cc. water and
500 cc. acetone and drying again. The weight of the layer averages 2 g./sq. metre. Exposure: 120 sec. Receiving support: paper receiving printing plate. Transfer operation: the receiving printing plate is immersed for a few seconds in acetone, and then pressed together with the imagewise exposed screen sheet. Transfer speed: 3 m. Transfer pressure: 1.7 kg. Separation: shortly after pressing-together. The transfer image formed on the printing plate is a hardly visible positive. Finishing: after drying, the image side of the paper printing plate is washed with a 2% by weight gum arabic solution and dried. With the finished printing plate, positive offset prints are obtained.

Instead of acetone, 1.4-dioxana, methyl acetate, methoxy ethyl acetate, ethyl lactate may be used as transfer liquid while varying, if necessary, the time between pressing-together and separation.

*Example XIII*

Screen sheet according to FIGS. 6 and 7. Center distance 9:50 microns. Light transmission: 10%. A hydrophilic auxiliary layer of 3 g./sq. metre was formed on the screen side by casting a 10% by weight aqueous solution of gum arabic and drying. A permeable hydrophobic layer was formed on this hydrophilic layer by thinly coating it with:

100 g. cellulose acetate butyrate in
25 g. ethylene glycol and
1000 cc. ethyl acetate and drying. Then the light-sensitive layer was formed by casting:

80 g. gelatin
20 g. diazo aldehyde
20 g. magnesium sulphate in
1000 cc. water and drying. The weight of the layer averages 3 g./sq. metre. The layer is water-receptive, swellable with water, and becomes adhesive on wetting with water. Exposure: 200 sec. Receiving support: paper receiving printing plate. Transfer operation: the imagewise exposed screen sheet is immersed for about 15 sec. and then pressed together with the receiving printing plate. Transfer speed: 2.5 m. Transfer pressure: 2 kg. Separation: shortly after pressing-together. The transfer image formed on the printing plate is a hardly visible positive. Finishing: the plate is exposed for approximately 60 sec., and thereupon treated with fixing solution and dried. With the finished printing plate, positive offset prints are obtained.

*Example XIV*

Screen sheet according to FIGS. 6 and 7. Center distance 9:50 microns. Light transmission: 10%. The screen sheet is sensitized by casting:

40 g. diazo aldehyde in
800 cc. water and
200 cc. methyl alcohol and drying. Exposure: 300 sec. Receiving support: a sheet of white art paper. Transfer operation: the receiving sheet is immersed for 30 sec. in a 3% by weight solution of gum arabic and subsequently freed from superfluous liquid; the imagewise exposed screen sheet is pressed together with the receiving sheet thus wetted. Transfer speed: 2 m. Transfer pressure: 1.5 kg. Separation: shortly after pressing-together. The transfer image formed consists only of diazo aldehyde. It is transformed into an azo dyestuff image by treatment with:

25 g. thiourea
50 g. sodium thiosulphate
10 g. borax
4 g. phloroglucinol
3 g. resorcinol
2 g. isopropylnaphthalene sulphonic acid sodium
20 g. sodium carbonate in
1000 cc. water The transfer image thus obtained is a dark brown-coloured positive reproduction of the original. Printing plates are obtained by transferring to finely grained aluminium printing plates instead of to art paper. In view of the fact that the first transfer is incomplete, more than one transfer may be carried out, using each time a fresh, finely grained aluminium printing plate. Approximately three transfers may thus be carried out with good results from one and the same imagewise exposed screen sheet. In the transfer operations the aluminum printing plates are slightly wetted on their grained surface and then pressed together with the imagewise exposed screen sheet. Transfer speed: 2 m. Transfer pressure: 1.5 kg. Finishing: the plate is exposed for 30 sec. or heated for 10 min. to a temperature of 160° C. With the finished printing plate, positive offset prints are obtained.

*Example XV*

Screen sheet according to FIGS. 6 and 7. Center distance 9: 50 microns. Light transmission: 10%. The light-sensitive layer was formed by casting:

80 g. gelatin
30 g. sodium salt of 4.4′-diazidostilbene-2.2′-disulphonic acid in
1000 cc. water and drying. The weight of the layer averages 3 g./sq. metre. The layer is water-receptive, swellable with water, and becomes adhesive on wetting with water. Exposure: 200 sec. Receiving support: finely grained aluminium printing plate. Transfer operation: in the apparatus according to FIG. 11; the receiving printing plate is wetted. Transfer speed: 2.7 m. Transfer pressure: 2.5 kg. Separation: shortly after pressing-together. The transfer image formed on the printing plate is a hardly visible positive. Finishing: the plate is exposed for 150 sec., wetted and inked, treated with fixing solution, dried, rinsed with water, and dried again. With the finished printing plate, positive offset prints are obtained.

*Example XVI*

Screen sheet according to FIGS. 6 and 7. Center distance 9: 50 microns. Light transmission: 10%. The light-sensitive layer is formed by casting:

80 g. gelatin in
1000 cc. water and, after drying, impregnating with:

20 g. ammonium bichromate in
100 cc. water and drying again. The weight of the layer averages 2–3 g./sq. metre. The layer is water-receptive, swellable with water, and becomes adhesive on wetting with water. Exposure: 200 sec. Receiving support: finely grained aluminium printing plate. The transfer operation as well as the finishing are carried out in the manner described in Example XV. With the finished printing plate, positive offset prints are obtained.

*Example XVII*

Screen sheet according to FIGS. 6 and 7. Center distance 9: 50 microns. Light transmission: 10%. The light-sensitive layer was formed by casting:

80 g. gelatin
20 g. diazo aldehyde
20 g. magnesium sulphate
20 g. carbon black in
1000 cc. water and drying. The weight of the layer averages 2.7 g./sq. metre. The layer is water-receptive, swellable with water, and becomes adhesive on wetting with water. Exposure: 150 sec. Receiving support: finely grained aluminium printing plate. Transfer operation: in the apparatus according to FIG. 11; the receiving printing plate is wetted. Transfer speed: 3 m. Transfer pressure: 2.5 kg. Separation: shortly after pressing-together. The transfer image formed on the printing plate is positive. If necessary, the printing plate is retouched. Finishing: the plate is exposed for 30 min. to concentrated formalin vapour, and subsequently treated with fixing solution. After drying, positive offset prints are obtained with the finished printing plate.

Alternative finishing method: instead of the printing plate carrying the transfer image being treated with formalin vapour, it is immersed for 5 min. in a 5% by weight solution of alum in water and then rinsed with water and dried. After drying, the image side is treated with fixing solution and dried. With the finished printing plate, positive offset prints are again obtained. When transfer is effected in the apparatus according to FIG. 11 on to a sheet of white art paper, the screen sheet is wetted. Transfer speed: 2.5 m. Transfer pressure: 2 kg. Separation: shortly after pressing-together. The transfer image formed is positive.

The light-sensitive screen sheet may likewise be used for making a screen reflex copy from an original with halftone dots having 625 individual screen dots per sq. cm. Exposure: 150 sec. Receiving support: a copper receiving printing plate with a smooth, properly cleaned surface. Transfer operation: the imagewise exposed screen sheet is immersed for 5 sec. and then pressed together with the copper receiving printing plate. Transfer speed: 2.5 m. Transfer pressure: 1 kg. Separation: shortly after pressing-together. The receiving printing plate is positive. If necessary, it is retouched. Finishing: the plate is kept for 5 min. at 150° C. It is then cooled. The image side is subsequently etched for 20 min. with a ferric chloride solution of 40° Bé. (the transferred matter functions as a resist). Thereupon it is thoroughly washed in running water and dried. The dotted relief printing plate thus obtained is inked in the manner commonly used in relief printing. A positive print is made by pressing a sheet of art paper against the inked side of the plate, and subsequently separating it therefrom again. The print thus obtained shows a positive, laterally reversed reproduction of the original.

When a screen reflex copy is made from a pen drawing in thin lines on white paper with the light-sensitive screen sheet, an intaglio plate may be obtained in the following way:

Exposure: 150 sec. First transfer operation: on art paper as receiving support in the apparatus according to FIG. 11; the screen sheet is wetted. Transfer speed: 2.5 m. Transfer pressure: 1.75 kg. The sheets are separated. The transfer image is positive, the remnant image on the screen sheet is hardly visible and negative.

Second transfer operation: on a properly cleaned copper printing plate as receiving support; after drying, the remnant image is pressed against the previously wetted surface of the printing plate. Transfer speed: 2 m. Transfer pressure: 1 kg. Separation: about 1 min. after pressing-together. Finishing: the printing plate is kept for 10 min. at 150° C. and after cooling, etched for 20 min. with the ferric chloride solution described above. Thereupon it is thoroughly washed with water and dried. With the thus finished intaglio printing plate, laterally reversed intaglio prints are obtained.

*Example XVIII*

Screen sheet according to FIGS. 6 and 7. Center distance 9: 50 microns. Light transmission: 10%. The light-sensitive layer was formed by casting:

60 g. gelatin
15 g. diazo aldehyde
10 g. Crystal Violet in
1000 cc. water and drying. The weight of the layer averages 3.5 g./sq. metre. Exposure: 240 sec. Receiving support: white art paper. Transfer operation: in the apparatus according to FIG. 11; the receiving sheet is wetted. Transfer speed: 2.7 m. Transfer pressure: 1 kg. Separation: shortly after pressing-together. The transfer image formed is a blue positive. The transfer may be repeated (approximately 4 to 5 times).

*Example XIX*

Screen sheet according to FIGS. 6 and 7. Center distance 9: 50 microns. Light transmission: 6%. A hydrophilic auxiliary layer of 1.5 g./sq. metre was formed on the screen side by casting a 5% by weight aqueous solution of gum arabic and drying. On this hydrophilic layer a porous hydrophobic layer was formed by thinly coating it with:

100 g. Victoria Blue
25 g. cellulose acetate butyrate in
1000 cc. ethyl acetate and drying. The elevations of the screen relief were cleaned with soft, smooth leather. Thereupon the light-sensitive layer was formed by casting:

80 g. gelatin
20 g. diazo aldehyde
20 g. magnesium sulphate in
1000 cc. water and drying. The layer weighs approximately 3.5 g./sq. metre. It is water-receptive, swellable with water, and becomes adhesive on wetting with water. Exposure: 240 sec. Receiving support: a sheet of white writing paper. Transfer operation: in the apparatus according to FIG. 11; the imagewise exposed screen sheet is wetted. Transfer speed: 2 m. Transfer pressure: 3 kg. Separation: shortly after pressing-together. The transfer image formed is a blue-coloured positive image, very stable against wetting.

If after the formation of the porous hydrophobic layer the elevations of the screen relief are not cleaned, a transfer image without visible screen openings is obtained.

*Example XX*

An unsensitized screen sheet according to Example III, but with a light transmission of 15% is sensitized by impregnating it on one side with:

30 g. diazo aldehyde in
500 cc. ethyl alcohol and
500 cc. water and drying. Exposure: 250 seconds. Receiving support: a sheet of while writing paper. Transfer operation: the receiving support is immersed in an aqueous solution of 3% by weight of gum arabic and, after removal of the excess liquid, pressed together with the imagewise exposed screen sheet. Transfer speed: 3 m. Transfer pressure: 2 kg. Separation: shortly after pressing-together. The transfer image formed consists only of diazo aldehyde. It is transformed into an azo dyestuff image in the manner described in Example XIV. The transfer image thus obtained is a brown coloured positive reproduction of the original.

*Example XXI*

Screen sheet according to FIGS. 6 and 7. Center distance 9: 40 microns. Light transmission: 8%. The light-sensitive layer was formed by casting:

40 g. gelatin
15 g. diazo aldehyde in
1000 cc. water and drying. The weight of the layer averages 3.2 g./sq. metre. It is water-receptive, swellable with water, and becomes adhesive on wetting with water. Exposure: 90 sec. Receiving printing plate: a bi-metal plate (a stainless steel plate having a thin layer of copper on one of its sides). Transfer operation: the imagewise exposed screen sheet is wetted and pressed against the copper surface of the bi-metal plate. Transfer speed: 2 m. Transfer pressure: 1.8 kg. Separation: shortly after pressing-together. The planographic printing plate formed is positive. Finishing: the printing plate is etched with ferric chloride solution of 40° Bé, until, except under the transferred matter, which serves as a "resist," the copper layer has disappeared; it is thoroughly washed in running water, the transferred matter is removed until the positive copper image becomes visible on the stainless steel plate, the plate is dried and provided with a thin layer of offset printing ink, the ink is removed from the stainless steel surface by washing with a sponge which has been soaked in:

50 g. copper nitrate
50 cc. hydrochloric acid (s.g. 1.19)
50 cc. nitric acid (s.g. 1.13)
900 cc. water and the plate is rinsed with water and inked. With the printing plate thus finished, positive offset prints are obtained.

What we claim is:

1. A light-sensitive photographic transfer sheet comprising a sheet-like support pervious to actinic light, a permanent reflectographic light screen permanently united with and covering the area of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts, and a layer structure adherently united with but transferable from one side of said support and lying adjacent to said screen, said structure including a light sensitive layer covering said screen and forming an outer surface of said sheet and containing a lyophilic organic colloid sensitized with a compound which upon exposure to said light materially alters an adhesion power possessed by said layer in the presence of a liquid that wets said colloid, said compound being selected from the group consisting of light-sensitive diazo compounds and light-sensitive azido compounds and being present at least at said outer surface, at least one of the constituents of said structure being a substance cohering with said compound and adapted to form a durable image on a receiving surface and selected from the group consisting of finely divided pigments, dyestuffs and hydrophobic solid matter, said light-sensitive layer structure being substantially free at least over said light-pervious area from grains that scatter actinic light and normally being non-tacky, said layer together with at least part of said image-forming substance being adherable to a receiving surface with a strength greater than that of the adherence thereof to other parts of the sheet, and thus being transferable bodily from said screened support to said receiving surface, by a wetting of said layer with said liquid followed by a pressing of said receiving surface against said outer surface and a separation of said receiving surface from said outer surface, said layer being divisible imagewise by an imagewise exposure thereof to said light into two distinct groups of latent image portions respectively lying in the exposed and relatively unexposed areas thereof and so differing in their adhesion powers that the image portions of one of said groups, with at least in part the portions of said image-forming substance located in the corresponding areas of the sheet, are selectively adherable to said receiving surface as aforesaid and severable from the other parts of the sheet, and thus are selectively transferable bodily as aforesaid to form an image of said substance on said receiving surface.

2. A light-sensitive sheet as described in claim 1, said image-forming substance being in a layer extending over said light-pervious screen areas and having over those areas an optical density of less than 0.8 for said light.

3. A light-sensitive sheet as described in claim 1, said light pervious screen areas having the form of islands spaced apart by said light-impervious screen parts at a center distance of from 20 to 80 microns.

4. A light-sensitive photographic transfer sheet comprising a sheet-like support pervious to actinic light, a permanent reflectographic light screen permanently united with and covering one side of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts, said support being formed over said one side with a myriad of elevations regularly spaced one from another at a center distance of from 20 to 80 microns and interspersed with recesses surrounding said elevations and tapered to reduced width towards their bottoms, said elevations coinciding with said light pervious screen areas and said light-impervious screen parts coinciding with said bottoms, said recesses containing hydrophobic solid matter overlying said screeen parts, and a light-sensitive layer overlying and cohering with said hydrophobic matter so as to be transferable therewith away from said screen and said support, said layer forming an outer surface of said sheet and comprising a hydrophilic organic colloid impregnated with a compound which upon exposure to said light materially alters an adhesion power possessed by said layer in the presence of a liquid that wets said colloid, said compound being selected from the group consisting of light-sensitive diazo compounds and light-sensitive azido compounds and being present at least at said outer surface, said layer being substantially free at least over said light-pervious screen areas from grains that scatter actinic light and normally being non-tacky, said layer together with said hydrophobic matter being adherable to a receiving surface with a strength greater than that of the adherence thereof to other parts of the sheet and thus being transferable bodily from the screened support to said receiving surface, by a wetting of said layer with said liquid followed by a pressing of said receiving surface against said outer surface and a separation of said receiving surface from said outer surface, said layer being divisible imagewise by an imagewise exposure thereof to said light into two distinct groups of latent image portions respectively lying in the exposed and relatively unexposed areas thereof and so differing in their adhesion powers that the image portions of one of said groups, with the portions of said hydrophobic matter located in the corresponding areas of the sheet, are selectively adherable to said receiving surface as aforesaid and severable from the other parts of the sheet, and thus are selectively transferable bodily as aforesaid to form an image of said hydrophobic matter on said receiving surface.

5. A light-sensitive photographic transfer sheet comprising a sheet-like support pervious to actinic light, a permanent reflectographic light screen permanently united with and covering the area of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts and having the form of islands spaced apart by said light-impervious screen parts at a center distance of from 20 to 80 microns, and a light-sensitive layer adherently united with but transferable from one side of said support and lying adjacent to said screen, said layer covering said screen and forming an outer surface of said sheet and comprising a hydrophilic organic colloid impregnated with a coloring substance selected from the group consisting of finely divided pigments and dyestuffs and with a compound which upon exposure to said light materially alters an adhesion power possessed by said layer in the presence of a liquid that wets said colloid, said compound being selected from the group consisting of light-sensitive diazo compounds and light-sensitive azido compounds and being present at least at said outer surface, said layer having over said light pervious screen areas an optical density of less than 0.8 for said light, said light-sensitive layer being substantially free from grains that scatter actinic light and normally being non-tacky, said layer together with at least part of said coloring substance being adherable to a receiving surface with a strength greater than that of the adherence thereof to other parts of the sheet, and thus being transferable bodily from said screened support to said receiving surface, by a wetting of said layer with said liquid followed by a pressing of said receiving surface against said outer surface and a separation of said receiving surface from said outer surface, said layer being divisible imagewise by an imagewise exposure thereof to said light into two distinct groups of latent image portions respectively lying in the exposed and relatively unexposed areas thereof and so differing in their adhesion powers that the image portions of one of said groups, with at least in part the portions of said coloring substance located in the corresponding areas of the sheet, are selectively adherable to said receiving surface as aforesaid and severable from the other parts of the sheet, and thus are selectively transferable bodily as aforesaid to form an image of said coloring substance on said receiving surface.

6. A light-sensitive photographic transfer sheet comprising a sheet-like support pervious to actinic light, a reflectographic light screen permanently united with and covering the area of said support, said screen being composed of a myriad of screen parts substantially impervious to said light interspersed in a regular shaped pattern, without intermediate gradated transitions, with screen areas pervious to said light, said light-pervious screen areas covering a smaller proportion of the area of said support than said light-impervious screen parts and having the form of islands spaced apart by said light-impervious screen parts at a center distance of from 20 to 80 microns, and a hydrophobic light-sensitive layer adherently united with but transferable from one side of said support and lying adjacent to said screen, said screen having a hydrophobic surface over one side thereof, said layer lying next to said hydrophobic surface and forming an outer surface of said sheet and comprising a hydrophobic colloid impregnated with a compound which upon exposure to said light materially alters an adhesion power possessed by said layer in the presence of a liquid that wets said colloid, said compound being selected from the group consisting of light-sensitive diazo compounds and light-sensitive azido compounds and being present at least at said outer surface, said layer having over said light pervious screen areas an optical density of less than 0.8 for said light, said light-sensitive layer being substantially free at least over said light pervious areas from grains that scatter actinic light and normally being non-tacky, said layer being adherable to a receiving surface with a strength greater than that of the adherence thereof to other parts of the sheet, and thus being transferable bodily from said screened support to said receiving surface, by a wetting of said layer with said liquid followed by a pressing of said receiving surface against said outer surface and a separation of said receiving surface from said outer surface, said layer being divisible imagewise by an imagewise exposure thereof to said light into two distinct groups of latent image portions respectively lying in the exposed and relatively unexposed areas thereof and so differing in their adhesion powers that the image portions of one of said groups are selectively adherable to said receiving surface as aforesaid and severable from the other parts of the sheet, and thus are selectively transferable bodily as aforesaid to form an image on said receiving surface.

7. A light-sensitive sheet as described in claim 6, said hydrophobic surface being formed by a cellulose ester laid over said screen between the screen and said hydrophobic light-sensitive layer.

8. A light-sensitive sheet as described in claim 6, said light sensitive compound being a condensation product of formaldehyde and a para-diazo-diphenylamine.

9. A light-sensitive sheet as described in claim 1, said screen having a hydrophobic surface over the side thereof covered by said layer structure, said light-sensitive compound being a condensation product of formaldehyde and a para-diazo-diphenylamine.

10. A light-sensitive sheet as described in claim 1, said screen having a hydrophobic surface over the side thereof covered by said layer structure, said light-sensitive compound being 4.4′-diazido-stilbene-disulphonic acid-2.2′.

11. A light-sensitive photographic transfer sheet comprising a sheet-like support pervious to actinic light, a permanent reflectographic light screen permanently united with and covering the area of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts and having the form of islands spaced apart by said light-impervious screen parts at a center distance of from 20 to 80 microns, a light-sensitive layer adherently united with but transferable from one side of said support and lying adjacent to said screen, said layer covering said screen and forming an outer surface of said sheet, and hydrophobic solid matter cohering with said light sensitive layer between at least said light impervious parts of said screen and said outer surface, said light-sensitive layer comprising an organic colloid impregnated with a compound which upon exposure to said light materially alters an adhesion power possessed by said layer in the presence of a liquid that wets said colloid, said compound being selected from the group consisting of light-sensitive diazo compounds and light-sensitive azido compounds and being present at least at said outer surface, said hydrophobic matter having over said light pervious screen areas an optical density of less than 0.8 for said light, said light-sensitive layer being substantially free at least over said light pervious areas from grains that scatter actinic light and normally being non-tacky, said layer together with said hydrophobic matter being adherable to a receiving surface with a strength greater than that of the adherence thereof to other parts of the sheet and thus being transferable bodily from the screened support to said receiving surface, by a wetting of said layer with said liquid followed by a pressing of said receiving surface against said outer surface and a separation of said receiving surface from said outer surface, said layer being divisible imagewise by an imagewise exposure thereof to said light into two distinct groups of latent image portions respectively lying in the exposed and relatively unexposed areas thereof and so differing in their adhesion powers that the image portions of one of said groups, with the portions of said hydrophobic matter located in the corresponding areas of the sheet, are selectively adherable to said receiving surface as aforesaid and severable from the other parts of the sheet, and thus are selectively transferable bodily as aforesaid to form an image of said hydrophobic matter on said receiving surface.

12. A light-sensitive sheet as described in claim 11, said colloid being a hydrophobic organic colloid.

13. A light-sensitive sheet as described in claim 11, said colloid being a hydrophilic organic colloid, said hydrophobic matter being porous and permeable by water.

14. A photographic process for the production of a transfer image on a receiving surface, which comprises image-wise exposing to actinic light a light-sensitive sheet with said sheet lying between the source of said light and an original and with the light-sensitive layer of the sheet in contact with the original, said sheet comprising a sheet-like support pervious to actinic light, a permanent reflectographic light screen permanently united with and covering the area of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts, and a layer structure adherently united with but transferable from one side of said support and lying adjacent to said screen, said structure including a light sensitive layer covering said screen and forming an outer surface of said sheet and containing a lyophilic organic colloid sensitized with a compound which upon exposure to said light materially alters an adhesion power possessed by said layer in the presence of a liquid that wets said colloid, said compound being selected from the group consisting of light-sensitive diazo compounds and light-sensitive azio compounds and being present at least at said outer surface, at least one of the constituents of said structure being a substance cohering with said compound and adapted to form a durable image on a receiving surface and selected from the group consisitng of finely divided pigments, dyestuffs and hydrophobic solid matter, said layer structure being substantially free at least over said light pervious areas from grains that scatter actinic light and normally being non-tacky; thereafter applying to said layer a liquid that wets said colloid and rendering those portions of said layer in only one of the two groups of latent image areas, exposed and relatively unexposed areas, substantially more adhesive to a receiving surface than to other parts of said sheet; then pressing a receiving surface against said wetted layer and adhering said receiving surface selectively to said more adhesive portions; and by then separating said receiving surface from said support severing and transporting said more adhesive portions together with the image-forming substance in said one group of areas away from the other parts of said sheet in the form of an image adhering to said receiving surface.

15. A process for the production of a relief printing plate, which comprises image-wise exposing to actinic light a light-sensitive sheet with said sheet lying between the source of said light and an original and with the light-sensitive layer of the sheet in contact with the original, said sheet comprising a sheet-like support pervious to actinic light, a reflectographic light screen permanently united with and covering the area of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts and having the form of islands spaced apart by said light-impervious screen parts at a center distance of from 20 to 80 microns, and a hydrophobic light-sensitive layer adherently united with but transferable from one side of said support and lying adjacent to said screen, said screen having a hydrophobic surface over one side thereof, said layer lying next to said hydrophobic surface and forming an outer surface of said sheet and comprising a hydrophobic colloid impregnated with a compound which upon exposure to said light materially alters an adhesion power possessed by said layer in the presence of a liquid that wets said colloid, said compound being selected from the group consisting of light-sensitive diazo compounds and light-sensitive azido compounds and being present at least at said outer surface, said layer having over said light pervious screen areas an optical density of less than 0.8 for said light, said light-sensitive layer being substantially free at least over said light pervious areas from grains that scatter actinic light and normally being non-tacky; thereafter applying to said layer an organic liquid that wets said colloid and rendering those portions of said layer in only the relatively unexposed areas thereof substantially more adhesive to the surface of a receiving metal printing plate than to other parts of said sheet; then pressing the surface of such plate against said wetted layer to adhere said plate surface selectively to said more adhesive portions; by then separating said plate from said support severing and transporting said more adhesive portions together with the hydrophobic colloid in said unexposed areas away from the other parts of said sheet in the form of an image adhering to said plate surface; and thereafter etching said plate surface between said adhering image portions to convert it into a relief printing plate.

16. A photographic process for the production of a planographic printing plate, which comprises image-wise exposing to actinic light a light-sensitive sheet with said sheet lying between the source of said light and an original and with the light-sensitive layer of the sheet in contact with the original, said sheet comprising a sheet-like support pervious to actinic light, a reflectographic light screen permanently united with and covering the area of said support, said screen being composed of a myriad of screen parts substantially impervious to said light interspersed in a regularly shaped pattern, without intermediate gradated transitions, with screen areas pervious to said light, said light-pervious screen areas covering a smaller proportion of the area of said support than said light-impervious screen parts and having the form of islands spaced apart by said light-impervious screen parts at a center distance of from 20 to 80 microns, and a hydrophobic light-sensitive layer adherently united with but transferable from one side of said support and lying adjacent to said screen, said screen having a hydrophobic surface over one side thereof, said layer lying next to said hydrophobic surface and forming an outer surface of said sheet and comprising a hydrophobic colloid impregnated at least at said outer surface with a condensation product of formaldehyde and a para-diazo-diphenylamine, said layer having over said light pervious screen areas an optical density of less than 0.8 for said light, said light-sensitive layer being substantially free at least over said light pervious areas from grains that scatter actinic light and normally being non-tacky; thereafter applying to said layer an organic liquid that wets said colloid and rendering those portions of said layer in only the relatively unexposed areas thereof substantially more adhesive to the surface of a receiving printing plate than to other parts of said sheet; then pressing said plate surface against said wetted layer to adhere said plate surface selectively to said more adhesive portions; and by then separating said plate from said support severing and transporting said more adhesive portions together with the hydrophobic colloid in said unexposed areas away from the other parts of said sheet in the form of an image adhering to said plate surface.

17. A planographic printing plate comprising a support formed with a hydrophilic printing surface bearing greasy-ink-receptive printing elements in the pattern of a photographic image of an original to be reproduced, each of said elements corresponding in outline to an element of said image and adhering to said surface and comprising a torn-out portion of a layer structure common to said elements and consisting essentially of a hydrophobic solid organic colloid selected from the group consisting of asphalt, shellac, colophony and hydrophobic synthetic resins, impregnated with a light-sensitive condensation product of formaldehyde and a p-diazo-diphenylamine.

References Cited in the file of this patent

UNITED STATES PATENTS

| | | |
|---|---|---|
| 1,118,479 | Dodge | Nov. 24, 1914 |
| 1,618,505 | Beebe et al. | Feb. 22, 1927 |
| 1,918,208 | Larsen | July 11, 1933 |
| 1,918,560 | Rehlander | July 18, 1933 |
| 2,026,292 | Van der Grinten | Dec. 31, 1935 |
| 2,051,585 | Van der Grinten | Aug. 10, 1936 |
| 2,100,063 | Zahn | Nov. 23, 1937 |
| 2,596,756 | Yutzy et al. | May 13, 1952 |
| 2,602,740 | Van der Grinten | July 8, 1952 |
| 2,602,741 | Van der Grinten | July 8, 1952 |
| 2,602,742 | Buskes et al. | July 8, 1952 |
| 2,692,827 | Brinnick | Oct. 26, 1954 |
| 2,714,066 | Jewett et al. | July 26, 1955 |
| 2,716,059 | Yutzy et al. | Aug. 23, 1955 |
| 2,747,999 | Yutzy et al. | May 29, 1956 |
| 2,754,279 | Hall | July 10, 1956 |
| 2,763,553 | Clark et al. | Sept. 18, 1956 |
| 2,772,160 | Hepher | Nov. 27, 1956 |

FOREIGN PATENTS

| | | |
|---|---|---|
| 904,255 | France | Feb. 19, 1945 |
| of 1909 27,655 | Great Britain | Nov. 28, 1910 |

UNITED STATES PATENT OFFICE
CERTIFICATE OF CORRECTION

Patent No. 3,010,391 November 28, 1961

Willem Marie Buskes et al.

It is hereby certified that error appears in the above numbered patent requiring correction and that the said Letters Patent should read as corrected below.

Column 7, lines 69 and 70, for "compart" read -- compare --; column 9, line 24, after "so" insert -- is --; column 12, line 13, for "planogrhpaic" read -- planographic --; line 30, strike out "the", first occurrence; column 27, line 14, for "while" read -- white --; column 31, line 61, for "azio" read -- azido --; lines 65 and 66, for "consisitng" read -- consisting --.

Signed and sealed this 17th day of April 1962.

(SEAL)
Attest:

ESTON G. JOHNSON
Attesting Officer

DAVID L. LADD
Commissioner of Patents